Jan. 31, 1961 E. C. RECHTIN 2,969,648

MOBILE DRILLING PLATFORM AND METHOD OF OPERATION

Filed Dec. 27, 1956 15 Sheets-Sheet 1

INVENTOR
Eberhardt C. Rechtin

BY R. S. A. Kloughety
ATTORNEY

INVENTOR
Eberhardt C. Rechtin

BY R. S. A. Hlougherty
ATTORNEY

INVENTOR
Eberhardt C. Rechtin
BY R. S. C. Hloughertz
ATTORNEY

Jan. 31, 1961 E. C. RECHTIN 2,969,648

MOBILE DRILLING PLATFORM AND METHOD OF OPERATION

Filed Dec. 27, 1956

15 Sheets-Sheet 4

INVENTOR
Eberhardt C. Rechtin

BY R. S. A. Dougherty
ATTORNEY

INVENTOR
Eberhardt C. Rechtin
BY R. S. A. Dougherty
ATTORNEY

INVENTOR
Eberhardt C. Rechtin
BY R. S. A. Dougherty
ATTORNEY

Jan. 31, 1961 E. C. RECHTIN 2,969,648

MOBILE DRILLING PLATFORM AND METHOD OF OPERATION

Filed Dec. 27, 1956 15 Sheets-Sheet 7

INVENTOR
Eberhardt C. Rechtin
BY R. S. A. Dougherty
ATTORNEY

Jan. 31, 1961 E. C. RECHTIN 2,969,648

MOBILE DRILLING PLATFORM AND METHOD OF OPERATION

Filed Dec. 27, 1956 15 Sheets-Sheet 8

INVENTOR
Eberhardt C. Rechtin

BY R. S. A. Dougherty
ATTORNEY

INVENTOR
Eberhardt C. Rechtin
BY R. S. C. Hloughertz
ATTORNEY

INVENTOR
Eberhardt C. Rechtin
BY R. S. A. Dougherty
ATTORNEY

Jan. 31, 1961 E. C. RECHTIN 2,969,648

MOBILE DRILLING PLATFORM AND METHOD OF OPERATION

Filed Dec. 27, 1956 15 Sheets-Sheet 11

INVENTOR

Eberhardt C. Rechtin

BY R. S. A. Dougherty

ATTORNEY

Jan. 31, 1961 E. C. RECHTIN 2,969,648

MOBILE DRILLING PLATFORM AND METHOD OF OPERATION

Filed Dec. 27, 1956 15 Sheets-Sheet 12

INVENTOR

Eberhardt C. Rechtin

BY R. S. A. Dougherty

ATTORNEY

INVENTOR
Eberhardt C. Rechtin
BY Nevil Greenwell.
ATTORNEY

Jan. 31, 1961 E. C. RECHTIN 2,969,648

MOBILE DRILLING PLATFORM AND METHOD OF OPERATION

Filed Dec. 27, 1956 15 Sheets-Sheet 14

INVENTOR
Eberhardt C. Rechtin
BY Nevil Greenwell.
ATTORNEY

Jan. 31, 1961 E. C. RECHTIN 2,969,648

MOBILE DRILLING PLATFORM AND METHOD OF OPERATION

Filed Dec. 27, 1956 15 Sheets-Sheet 15

INVENTOR
Eberhardt C. Rechtin

BY Nevil Greenwell.

ATTORNEY

United States Patent Office 2,969,648
Patented Jan. 31, 1961

2,969,648

MOBILE DRILLING PLATFORM AND METHOD OF OPERATION

Eberhardt C. Rechtin, Beaumont, Tex., assignor to Bethlehem Steel Company, a corporation of Pennsylvania Filed Dec. 27, 1956, Ser. No. 630,998

19 Claims. (Cl. 61—46.5)

This application is a continuation-in-part of my co-pending application for "Mobile Drilling Platform and Method of Operation," filed July 26, 1955, Serial No. 524,518, and now abandoned.

This invention relates to mobile platforms to be used for offshore operations, particularly those operations connected with the drilling of oil wells in marine locations as in the well-known "tidelands" in the Gulf of Mexico.

Basically, my mobile drilling platform comprises an operating platform, carrying the necessary operating equipment, supported on columns which, in turn, are secured to a buoyant foundation, so that the entire structure may be floated to the drilling site. At location, piles, extending through the columns and foundation, are embedded in the marine floor. The operating platform is then secured to the piles, and the foundation and columns are submerged to the marine floor. The foundation is firmly seated on the marine floor by pushing down on access trunks extending from said foundation up through the platform. In this manner, the weight of the operating platform and drilling load is distributed to the marine floor by the piles and by the foundation. The relocate the structure, these above-enumerated operations are essentially reversed in sequence.

To be completely mobile, a structure of the type contemplated for use in the Gulf of Mexico or in other similar areas must be capable of supporting itself while in transit between drilling sites, must be self-supporting while being set on location, must contain equipment for fixedly establishing itself on location, and must contain equipment for disestablishing itself from location prior to being removed to another drilling site. Additionally, to be practical from an economic point of view, the structure must be capable of withstanding the severe stresses imposed by rough waters and hurricanes, and must be self-sufficient in terms of drilling supplies and the like so that continuous drilling can be maintained with only periodic replenishment of supplies. These and other problems I have solved.

Accordingly, one of the objects of my invention is the design of a mobile drilling platform which can be floated to a drilling site and there established, and which can be removed and conveyed to another drilling site after it has served its purpose at the first location.

Another object of my invention relates to the means for gripping, pushing and pulling the access trunks and piling.

A further object of my invention relates to the means for restricting relative horizontal movement between the piles and the foundation.

Other objects and advantages of my invention will be apparent during the course of the following description.

While I have chosen for illustration the best embodiments of my invention known to me, my invention is capable of embodiment in my different forms, and the illustrated embodiments are, therefore, to be regarded only as typical, and my invention is not to be confined thereto.

Figure 1:
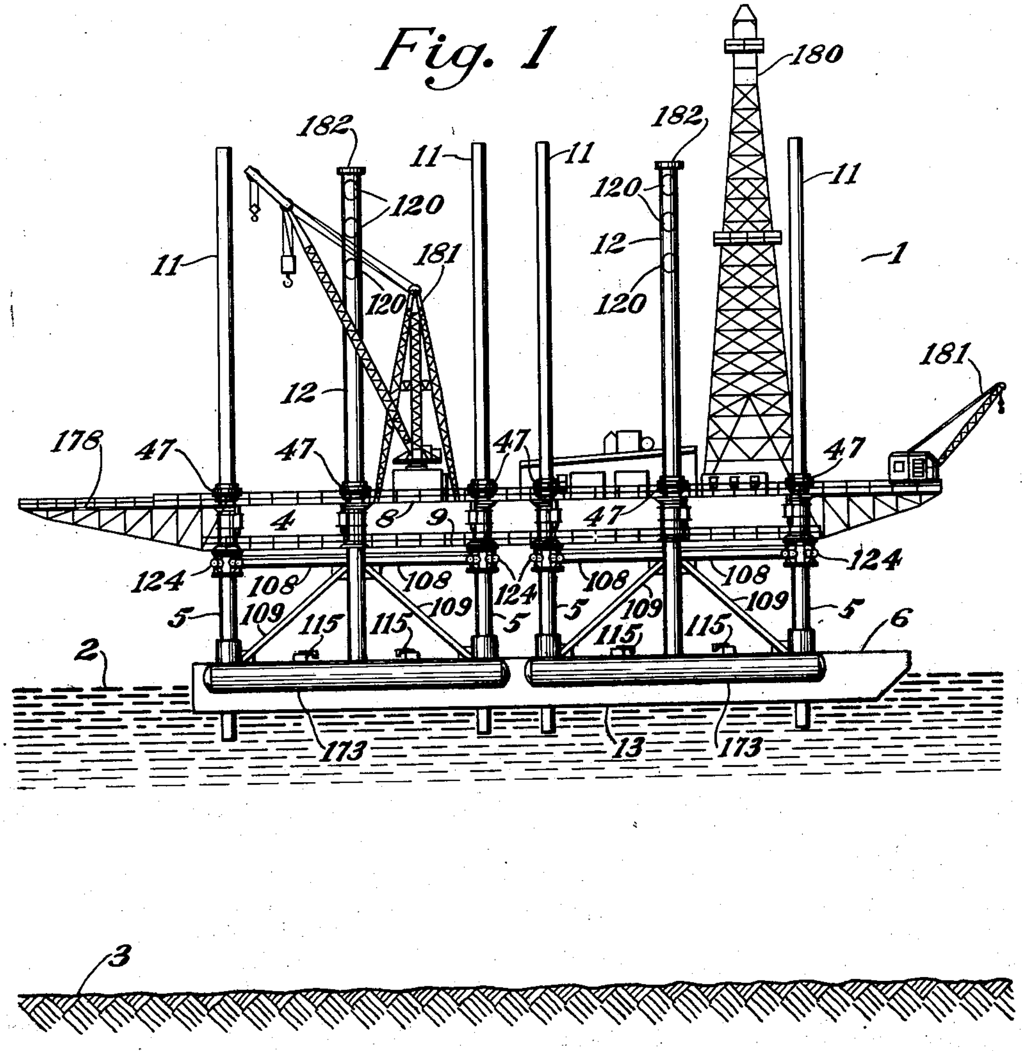
Fig. 1 represents a view in longitudinal elevation of my mobile drilling platform in the floating, or vertically non-extended position.
Figure 2:
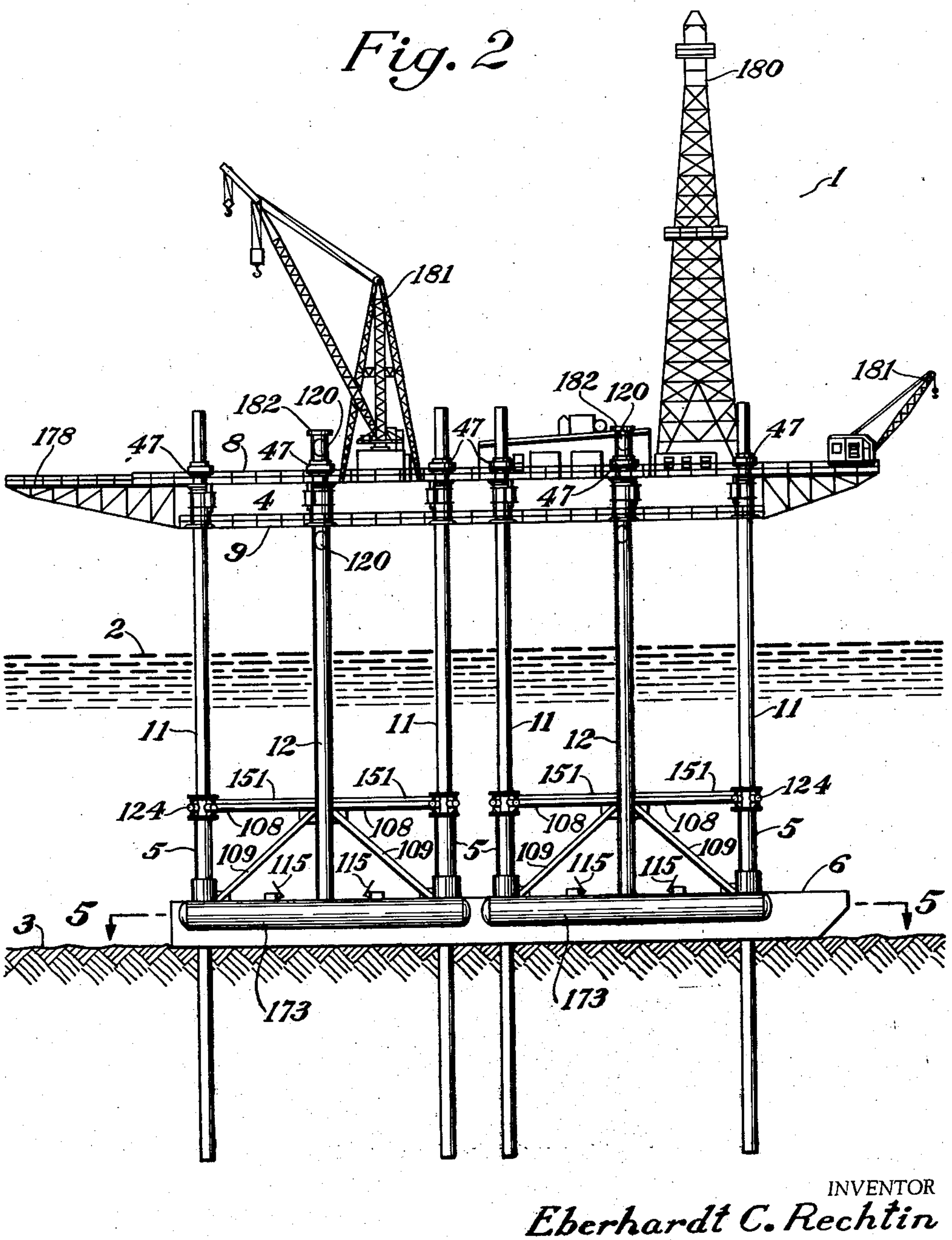
Fig. 2 represents a view in longitudinal elevation of my mobile drilling platform in the drilling, or vertically extended, position.

Referring now to the drawings, mobile drilling platform 1 is shown operating in a body of water 2 overlying a marine floor 3 (Fig. 1), and is seen to comprise operating platform 4 removably positioned on hollow pile guide columns 5 which, in turn, are secured to ballastable foundation 6 so that, in effect, operating platform 4 and foundation 6 are in vertically separable relationship (Fig. 2). Guide columns 5 extend through and above, and define unobstructed vertical openings 7 in, said foundation 6.

Operating platform 4 comprises upper deck 8 and lower deck 9. Unobstructed vertical openings 10 are established through operating platform 4, each of said openings 10 being in vertically registering relationship with one of said guide columns 5. Piles 11 are slidably received in, and thereby guided by, openings 10 and guide columns 5, one of said piles 11 being associated with each opening 10 and guide column 5. Access trunks 12 are secured to foundation 6, but do not perforate the bottom 13 thereof, and extend upwardly therefrom to be slidably received in, and thereby guided by, vertically registering openings 14 established through operating platform 4.

Figures 12, 21, 22:
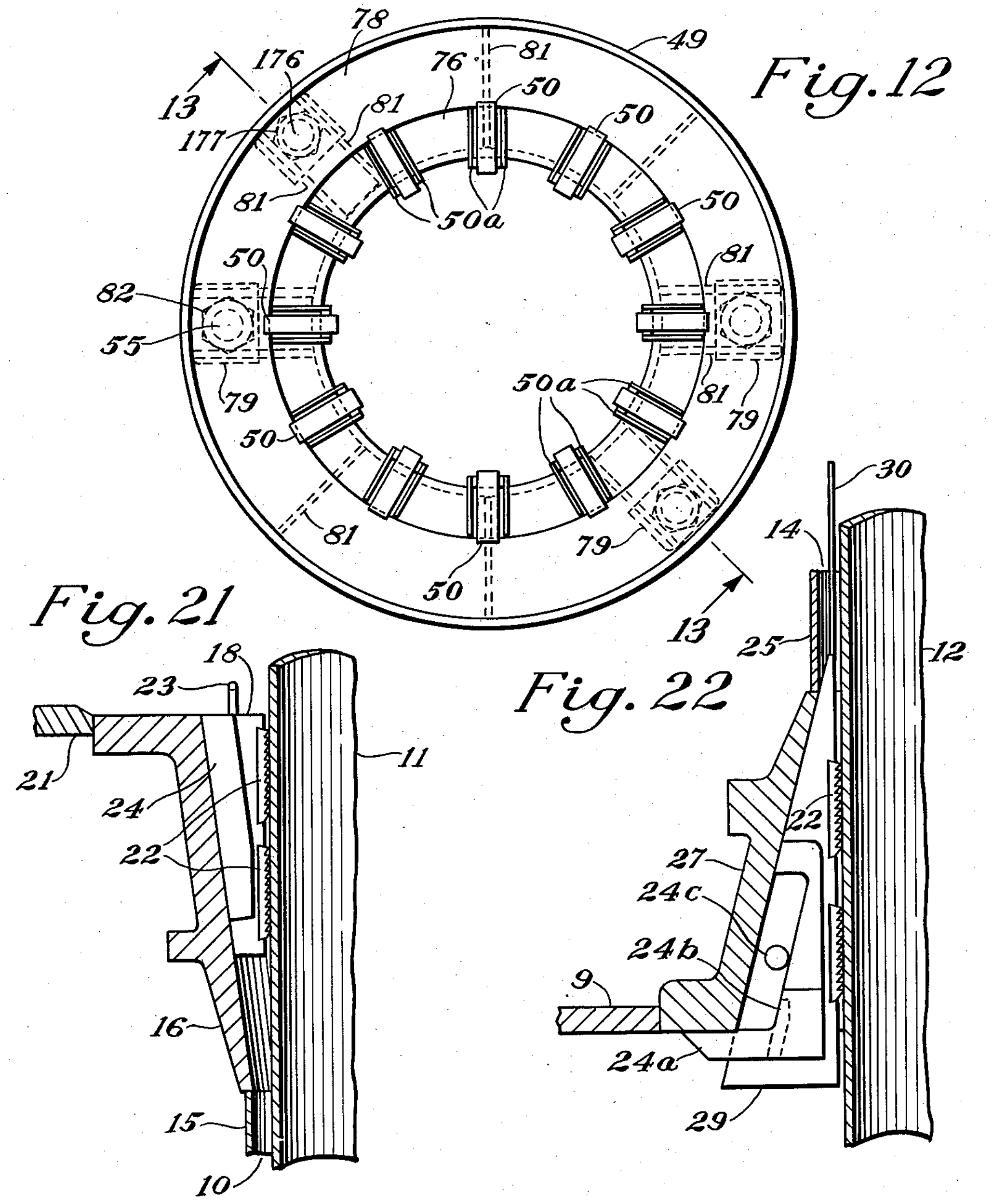
Fig. 12 represents a view in plan of the yoke used for the piles and access trunks, and shows the orientation of the double-wedges, piston rods and staybolts. The double-wedge positioners have been omitted for the sake of clarity.
Fig. 21 represents a detail of one of the non-movable yokes, and a wedge associated therewith, at the upper deck of the platform, at a pile station, but equally applicable to an access trunk station.
Fig. 22 represents a detail of one of the non-movable yokes, and a wedge associated therewith, at the lower deck of the platform adjacent an access trunk.

Each opening 10 (Fig. 7) is defined by pile guide tube 15, an upwardly and outwardly tapered yoke 16 interposed between, and secured to, upper deck 8 and the top of pile guide tube 15, and an upwardly and outwardly tapered yoke 17 interposed between, and secured to lower deck 9 and the bottom of pile guide tube 15. Wedges 18 are manually insertable in yoke 16, and, when so inserted, engage pile 11 at spaced intervals about the circumference thereof. Wedges 19 are manually insertable, through openings 20 in pile guide tube 15, in yoke 17, and, when so inserted, engage pile 11 at spaced intervals about the circumference thereof. Upper deck 8 may be stiffened, in the region of yoke 16, by means of plate 21. The tapers of wedges 18 and 19 match, respectively, the tapers of yokes 16 and 17, so that the pile-engaging faces of said wedges 18 and 19, roughened by friction blocks 22 or by other suitable means, are parallel to the longitudinal axis of opening 10, thus insuring uniform engagement of the pile 11 along said pile-engaging faces. Handholds 23 may be secured to the tops of wedges 18 and 19 to facilitate manual handling thereof. Spaced pairs of guides 24, the guides 24 of each pair being set apart sufficiently to receive a wedge 18 or 19, may be secured to yokes 16 and 17 (Fig. 21). When wedges 18 and 19 are inserted in their respective yokes 16 and 17, thus engaging pile 11, a ratcheting action results. Movement of pile 11 downwardly relative to operating platform 4 is prevented, and movement of pile 11 upwardly relative to operating platform 4 is not prevented.

Each opening 14 (Fig. 14) is defined by access trunk guide tube 25, an upwardly and outwardly tapered yoke 26 interposed between, and secured to, upper deck 8 and the top of access trunk guide tube 25, and a downwardly and outwardly tapered yoke 27 interposed between, and secured to, lower deck 9 and the bottom of access trunk guide tube 25. Wedges 28 are manually insertable in yoke 26, and when so inserted, engage access trunk 12 at spaced intervals about the circumference thereof. Wedges 29, spaced about the circumference of access trunk 12 are secured to bars 30 passing in the annular space between access trunk guide tube 25 and access trunk 12. Each bar 30 is engaged with a wedge positioner 31, and may be selectively raised or lowered so as to respectively engage or disengage wedge 29. It is to be noted that wedges 29, and bars 30 associated therewith, do not lie directly under wedges 28, but are set off to one side to avoid interference so that wedges 28 and wedge positioners 31 can both be operated from the level of upper deck 8. The tapers of wedges 28 and 29 match, respectively, the tapers of yokes 26 and 27, so that the access trunk-engaging faces of said wedges 28 and 29, roughened by friction blocks 22 or by other suitable means, are parallel to the longitudinal axis of opening 14, thus insuring uniform engagement of the access trunk 12 along said access trunk-engaging faces. Handholds 23 may be secured to the tops of wedges 28, to facilitate manual handling thereof. Spaced pairs of guides 24, the guides 24 of each pair being set apart sufficiently to receive a wedge 28, may be secured to yokes 26. Similarly, spaced pairs of guides **24*a*, the guides 24*a* of each pair being set apart sufficiently to receive a wedge 29, may be secured to yokes 27 (Fig. 22), and are preferably formed with inclined slot 24*b*** receiving pin 24c, the latter in turn being secured to wedge 29. Thus, when wedge 29 is lowered, the action of pin 24c in inclined slot 24b positively forces wedge 29 out of engagement. When wedges 28 are inserted in yoke 26, thus engaging access trunk 12, a ratcheting action results to the end that movement of access trunk 12 downwardly relative to operating platform 4 is prevented, while movement of access trunk 12 upwardly relative to operating platform 4 is not prevented. When wedges 29 are in their uppermost, or operative position, a ratcheting action is effected to the end that movement of access trunk 12 upwardly relative to operating platform 4 is prevented, while movement of access trunk 12 downwardly relative to operating platform 4 is not prevented.

Wedge positioner 31 (Fig. 23) is supported by parallel spaced brackets 32, which are secured to the rim of yoke 26. Links 33, located adjacent the exterior faces of brackets 32, are pivotally mounted on pin 34 extending through brackets 32. Spring support pin 35, passing through one end of spring guide 36, is rotatably mounted between brackets 32, and does not extend beyond the exterior faces thereof. Pin 37, passed through slotted opening 38 near the other end of spring guide 36, is rotatably mounted to links 33 at the outer ends thereof. Spring 39, over spring guide 36, bears against spring support pin 35 and pin 37, and is thus held in compression, and prevented from jumping out of position. Bar 30 is provided, at its upper end, with members 40 and 41. Pin 42, extending through opening 43 defined by members 40 and 41, is rotatably mounted to the inner ends of links 33. Cotter pins 44, washers 45 and spacers 46 are provided as shown.

The longitudinal axis of spring support pin 35 lies between pins 34 and 37. Spring 39, being under compression, will tend to assume a position of least compression. For these reasons, there are two positions of stability for wedge positioner 31. One such position is attained when spring 39 is tilted downwardly and bar 30 is in its uppermost position, further upward movement of bar 30 being prevented due to the engagement of wedge 29 between access trunk 12 and yoke 27. The second such position is attained when spring 39 is titled upwardly and bar 30 is in its lowermost position, further downward movement of bar 30 being prevented by member 40 bearing against yoke 26. The position of maximum compression of spring 39 occurs at a point intermediate the two stable positions, namely when spring support pin 35 and pins 34 and 37 are all in the same plane. Consequently, any tendency of wedge 29 to inadvertently spring out of a selected position causes an increase in the compression of spring 39 which tends to force wedge 29 back into the selected position. Wedge positioner 31 can be selectively positioned by applying a downward force on the inner or outer ends of links 33, as, for instance, by tapping with a hammer.

A number of gripping means 47 are provided on the operating platform 4, each of said gripping means 47 being above, and in vertically registering relationship with, one of said openings 10 (Fig. 7) or 14 (Fig 14), and being adapted to hold, push or pull a pile 11 or access trunk 12. Each of said gripping means comprises a pair of hydraulic rams 48, an annular yoke 49 adapted to be raised, lowered, or held stationary by said hydraulic rams 48, and double-wedges 50 spaced about the inner circumference of yoke 49 (Fig. 12).

Each hydraulic ram 48 comprises cylinder 51, upper port 52, lower port 53, piston 54, and piston rod 55 which extends upwardly through hole 56 in upper deck 8 of operating platform 4, and which is secured to annular yoke 49 in a manner to be described. Each cylinder 51 is held in bracket 57 which, in turn, is secured to pile guide tube 15 or to access trunk guide tube 25. Cylinder 51 is formed with shoulders 58 which bear against the top and bottom edges of bracket 57 and thus positively restrain said cylinder 51 from vertical movement. In order to insure a non-eccentric application of force to annular yoke 49, the pair of hydraulic rams associated therewith are mounted so as to lie on a diameter of said openings 10 or 14.

Figure 7:
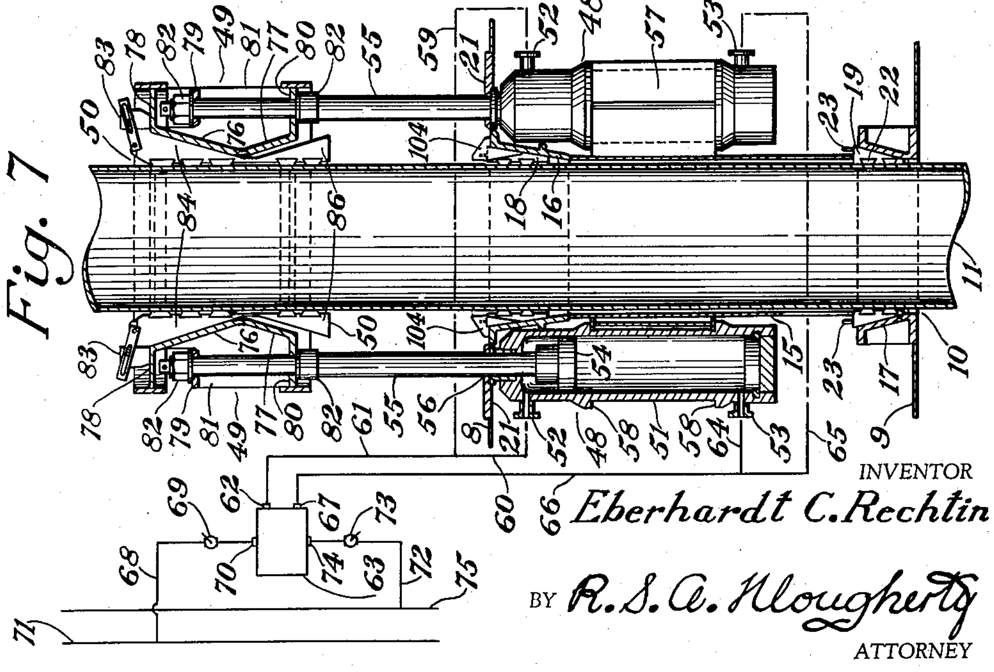
Fig. 7 represents a section of the pile gripping means, taken substantially along the line 7—7 of Fig. 3, and shows the manner of supporting a pile therein, and shows further a diagrammatic arrangement of the piping and valves associated therewith. The several pairs of spaced wedge guides have been omitted for the sake of clarity.

Upper ports 52 of each hydraulic ram 48 in a pair thereof are connected by piping 59 and 60 to a header 61 which, in turn, is connected to port 62 of four-way valve 63 (Fig. 7). Lower ports 53 of said pair of hydraulic rams 48 are connected by piping 64 and 65 to header 66 which, in turn, is connected to port 67 of four-way valve 63. High pressure line 68, passing through block valve 69, connects port 70 of four-way valve 63 with high pressure main 71. Return line 72, passing through block valve 73, connects port 74 of four-way valve 63 with sump main 75.

Four-way valve 63 can be set in any of three positions, identified below as A, B and C:

(A) To raise annular yoke 49 (port 67 communicating with port 70, and port 62 communicating with port 74): In this position, hydraulic fluid is forced into those sections of cylinders 51 below pistons 54, said pistons 54 rise, and hydraulic fluid above said pistons 54 is forced out of cylinders 51.

(B) Neutral, to hold annular yoke 49 stationary (ports 62 and 67 blocked): The hydraulic fluid being practically incompressible, pistons 54 are held in one position and cannot move.

(C) To lower annular yoke 49 (port 62 communicating with port 70, and port 67 communicating with port 74): In this position, hydraulic fluid is forced into those sections of cylinders 51 above pistons 54, said pistons 54 descend, and hydraulic fluid below said pistons 54 is forced out of cylinders 51.

High pressure main 71 and sump main 75, both serving the several pairs of hydraulic rams 48, are connected to a conventional pumping system in any well-known manner.

Valves of the type of four-way valve 63 are regularly manufactured, and a detailed description of the construction thereof is, therefore, believed to be unnecessary.

It can be seen, then, that I have devised an arrangement whereby the paired hydraulic rams 48 at any gripping means 47 are operated simultaneously, each gripping means 47 can be operated independently of the other gripping means 47, and any gripping means 47 can be isolated for the purpose of repairs or the like from all other gripping means 47 by closing block valves 69 and 73.

Figures 25, 26:
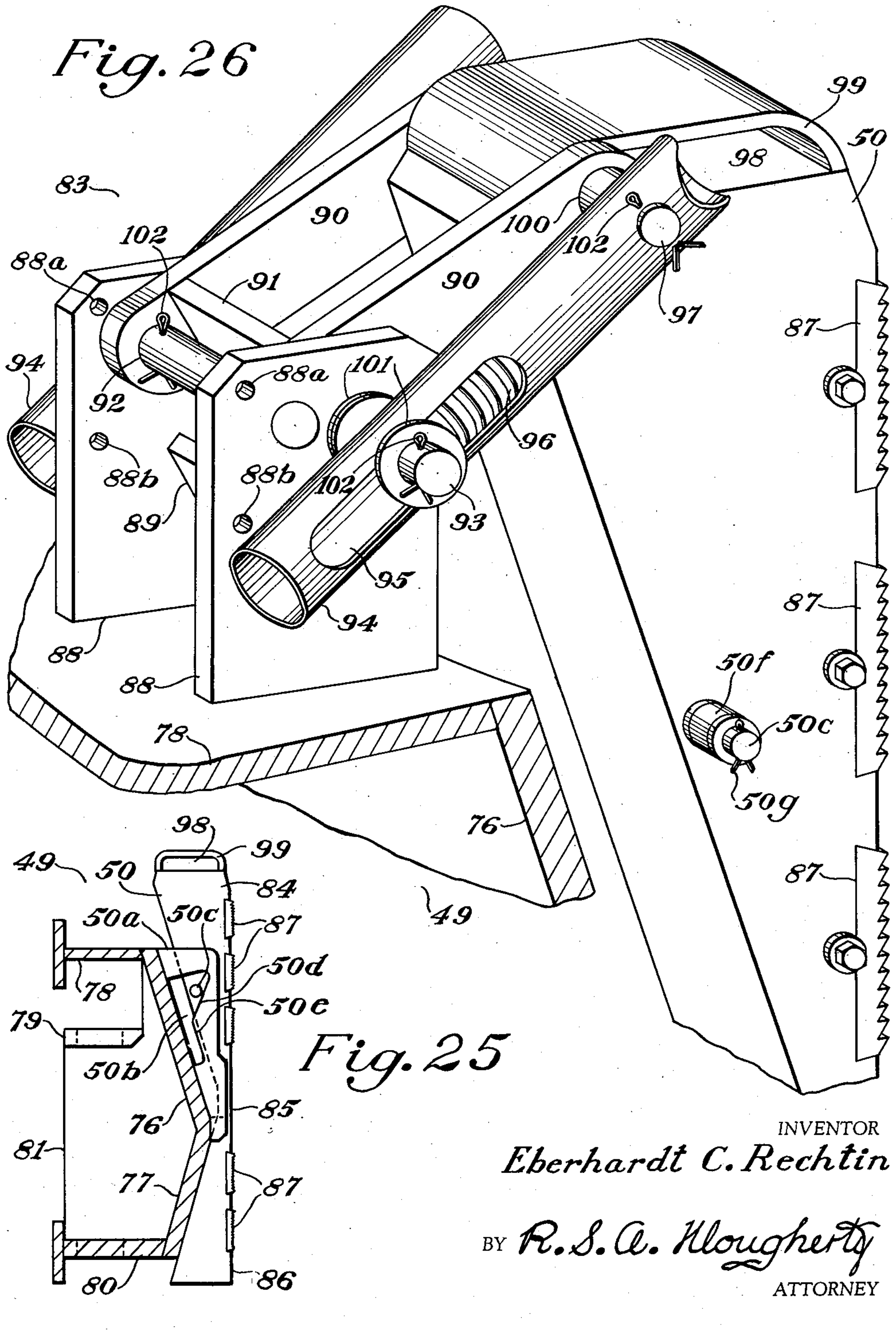
Fig. 25 represents a detail of one of the movable yokes and a double-wedge associated therewith.
Fig. 26 represents an isometric view of the double-wedge positioner.

Each annular yoke 49 (Fig. 25) comprises an upwardly and outwardly tapered conical section 76 surmounting in vertically registering relationship a downwardly and outwardly tapered conical section 77. An upper flange 78, plates 79 and a lower flange 80 are also provided. Webs 81, located about the perimeter of annular yoke 49, are secured to conical sections 76 and 77, to plates 79, and to lower flange 80, thereby stiffening said annular yoke 49 (Fig. 12).

Piston rods 55 extend through lower flange 80 and plates 79. Stops or nuts 82 threaded on, or otherwise secured to, said piston rods 55 and bearing against the upper and lower faces respectively of plates 79 and flanges 80 prevent any relative movement between said piston rods 55 and said annular yoke 49.

Double-wedges 50 are spaced about the inner circumference of annular yoke 49, and are each held in position by a double-wedge positioner 83. Each double-wedge 50 comprises an upper wedge segment 84, a flat segment 85, and a lower wedge segment 86, all aligned to present a straight pile—or access trunk-engaging face roughened by friction blocks 87 or by any other suitable means. The tapers of upper wedge segment 84 and lower wedge segment 86 match, respectively, the tapers of conical sections 76 and 77 of annular yoke 49, so that the pile—or access trunk-engaging face of double wedge 50 is parallel to the longitudinal axis of opening 10 or 14, thus insuring uniform engagement with the pile 11 or access trunk 12.

Spaced pairs of guides 50*a*, the guides 50*a* of each pair being set apart sufficiently to receive a double-wedge 50 may be secured to yokes 49, and are preferably formed with doubly-inclined opening 50*b* receiving pin 50*c*, the latter in turn being secured to double-wedge 50. The function of pin 50*c* and doubly-inclined opening 50*b* will be explained further on.

Double-wedge positioner 83 (Fig. 26) is supported by parallel spaced brackets 88, which are secured to upper flange 78 of annular yoke 49 and which are braced to each other by plate 89. A pair of wedge links 90, located between brackets 88 and braced to each other by plate 91, are pivotally mounted at their outer ends to support pin 92, which, in turn, is carried by brackets 88 and which does not extend past the exterior faces of said brackets 88. Spring pins 93 are secured, as by welding, to the exterior faces of brackets 88. Hollow spring links 94 are placed, through slotted openings 95 adjacent the outer ends thereof, over spring pins 93. Thus, spring links 94 are capable of pivotal reciprocating movement on spring pins 93. A spring 96 is placed in each of the hollow spring links 94. Wedge pin 97 is passed through the inner ends of both spring links 94, through the inner ends of both wedge links 90, and through opening 98 formed between member 99 and double-wedge 50. Wedge pin 97 keeps springs 96 in compression.

Spacers 100, washers 101, and cotter pins 102 are provided as shown. Spring links 94 are beveled as at 103 to insure clearance with adjacent double-wedge positioners 83.

Spring pins 93 at each double-wedge positioner 83 are in axial alignment. The longitudinal axis of spring pins 93 lies between wedge pin 97 and support pin 92. Springs 96, being under compression, will tend to assume a position of least compression. For these reasons, there are two positions of stability for double-wedge positioner 83. One such position is attained when spring links 94 are tilted downwardly and double-wedge 50 is in its downmost position, further downward movement of double-wedge 50 being prevented due to the engagement of upper wedge segment 84 between conical section 76 of annular yoke 49 and pile 11 or access trunk 12. The second such position is attained when spring links 94 are tilted upwardly and double-wedge 50 is in its uppermost position, further upward movement of double-wedge 50 being prevented due to the engagement of lower wedge segment 86 between conical section 77 of annular yoke 49 and pile 11 or access trunk 12. The position of maximum compression of springs 96 occurs at a point intermediate the two stable positions, namely when spring pins 93, wedge pin 97 and support pin 92 are all in the same plane. Consequently, any tendency of double-wedge 50 to inadvertently spring out of a selected position causes an increase in the compression of springs 96 which tends to force double-wedge 50 back into the selected position.

Figures 23, 27, 28, 29:
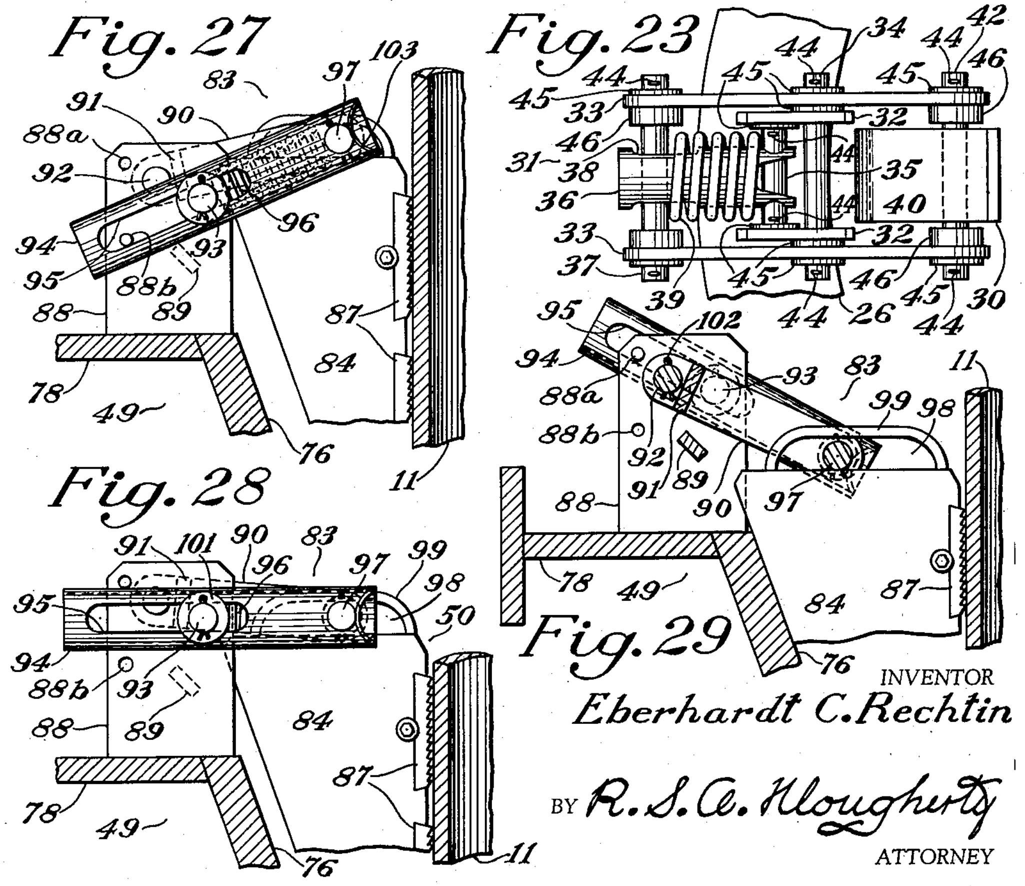
Fig. 23 represents a view in plan of the wedge positioner associated with the wedge of Fig. 22.
Fig. 27 represents a detail of the double-wedge positioner with the double-wedge in the uppermost position.
Fig. 28 represents a detail of the double-wedge positioner with the double-wedge in an intermediate position.
Fig. 29 represents a detail of the double-wedge positioner, with the double-wedge in the lowermost position.

As an added precaution against double-wedge 50 inadvertently springing out of position, I prefer to provide holes 88*a* and 88*b* in brackets 88 (Fig. 27). Holes 88*a* are so located in brackets 88 that when double-wedge 50 is in its lowermost position, a pin can be passed through slotted openings 95 of spring links 94 and said holes 88*a*, thus positively restraining double-wedge 50 from leaving its selected position. Similarly, holes 88*b* are so located in brackets 88 that when double-wedge 50 is in its uppermost position, a pin can be passed through slotted openings 95 of spring links 94 and said holes 88*b*.

Flat segment 85, interposed between upper wedge segment 84 and lower wedge segment 86, creates a transition, or neutral, zone between the uppermost position and the lowermost position of double-wedge 50. In said transition, or neutral, zone, neither upper wedge segment 84 nor lower wedge segment 86 is operatively engaged. When springs 96 are in the position of maximum compression, thus placing spring links 94 in a position of least stability, flat segment 85 is adjacent, but does not touch, the smallest internal diameter of annular yoke 49. In springing double-wedge 50 from its uppermost position to its lowermost position, pin 50*c* riding downwardly on portion 50*d* of doubly-inclined opening 50*b* positively forces double-wedge 50 out of engagement when the latter passes through the transition zone. Similarly, in springing double-wedge 50 from its lowermost position to its uppermost position, pin 50*c* riding upwardly on portion 50*e* of doubly-inclined opening 50*b* positively forces double-wedge 50 out of engaement when the latter passes through the transition zone. For smoother operation, pin 50*c* may be provided with a roller 50*f* held in place by cotter pin 50*g*.

Thus, by selectively positioning spring links 94, either upper wedge segment 84 or lower wedge segment 86 can be placed in operative engagement with pile 11 or access trunk 12.

When double-wedge 50 is in its uppermost position, a ratcheting action results such that upward movement of pile 11 or access trunk 12 relative to annular yoke 49 is prevented by lower wedge segment 86, whereas downward movement of said pile 11 or access trunk 12 relative to annular yoke 49 is not prevented.

When double-wedge 50 is in its downmost position, a ratcheting action results such that downward movement of pile 11 or access trunk 12 relative to annular yoke 49 is prevented by upper wedge segment 84, whereas upward movement of said pile 11 or access trunk 12 relative to annular yoke 49 is not prevented.

When double-wedge 50 is in its neutral, or transition, zone, pile 11 or access trunk 12 can move either upwardly or downwardly relative to annular yoke 49.

Thus, by operating hydraulic rams 48 to raise or lower annular yoke 49 in which double-wedges 50 have been properly positioned, as will be described in detail further on, pile 11 or access trunk 12 can be pulled up or pushed down.

Double-wedge 50 can be selectively sprung into a desired position by any suitable means. I prefer, in springing said double-wedge 50 from its uppermost to its lowermost position, to use a pry bar.

To spring double-wedge 50 from its lowermost to its uppermost position, I prefer to use fingers 104 or lugs 105 as described below.

Double-wedges 50 in annular yokes 49 at openings 10 and associated with piles 11 are so spaced about the inner circumferences of said annular yokes 49 as to lie above the spaces betwen wedges 18 in yokes 16. Below each double-wedge 50, and engageable therewith, is a finger 104, which is secured to the inner circumference of yoke 16 between wedges 18, and which projects above the level of upper deck 8. Thus, if double-wedge 50 is in its lowermost position, annular yoke 49 can be lowered until lower wedge segments 86 contacts finger 104, and upon further lowering of annular yoke 49, finger 104 will spring double-wedge 50 into its uppermost position.

Double-wedges 50 in annular yokes 49 at openings 14 and associated with access trunks 12 are so spaced about the inner circumferences of said annular yokes 49 as to lie above the spaces between wedges 28 and wedge positioners 31. Each of said double-wedges 50 is provided with a lug 105 secured to the bottom of lower wedge segment 86, near the outer edge thereof, and overlying the rim of yoke 26. Thus, if double-wedge 50 is in its lowermost position, annular yoke 49 can be lowered until lug 105 contacts the rim of yoke 26, and upon further lowering of annular yoke 49, lug 105 will spring double-wedge 50 into its uppermost position.

Figure 4:
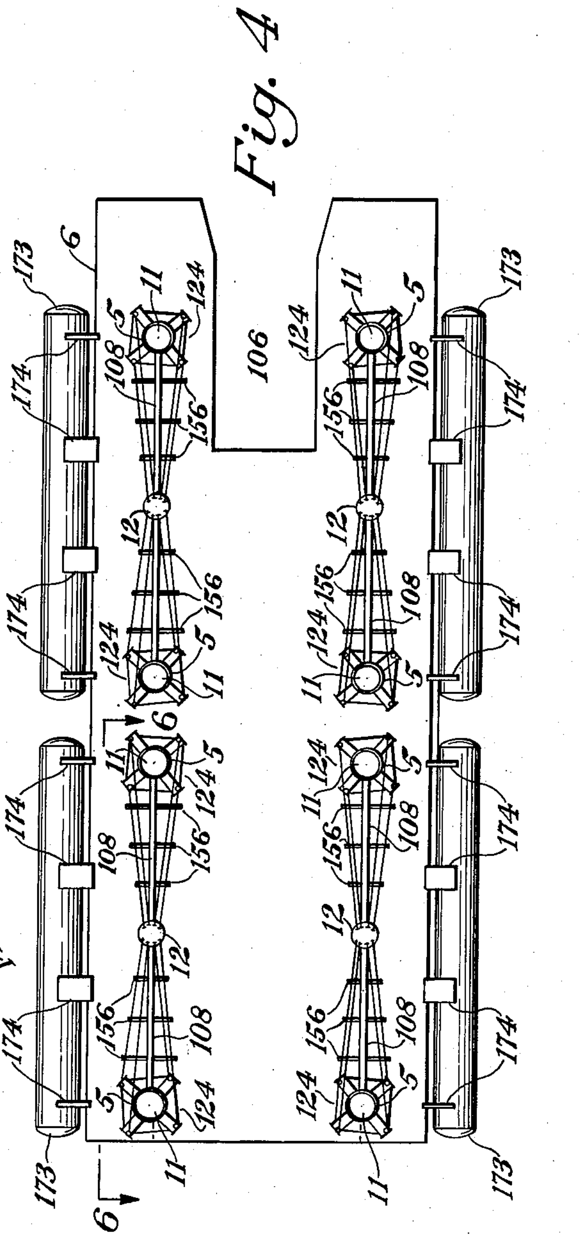
Fig. 4 represents a view in plan of the foundation.
Figure 6:
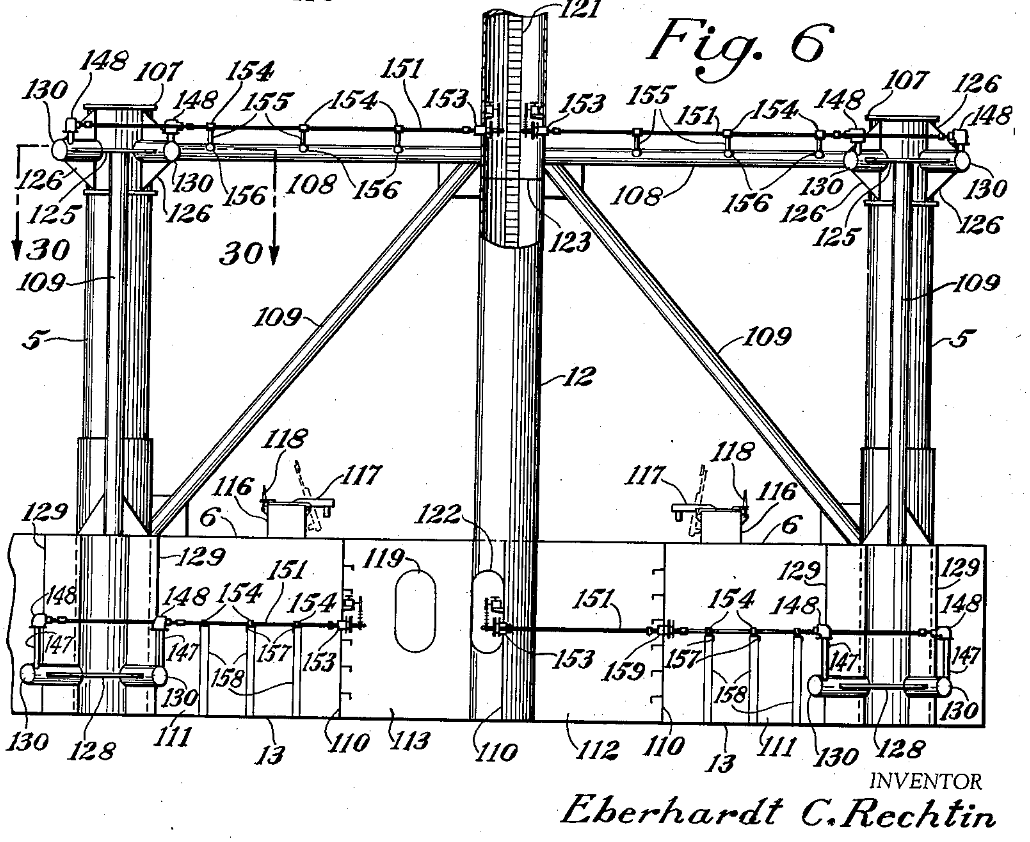
Fig. 6 represents a section in elevation of the foundation and associated structure, taken along the line 6—6 of Fig. 4.

Foundation 6 (Fig. 4) is formed with drilling slot 106, through which drilling operations may be conducted. Towing bits can be secured to any suitable part of foundation 6 to permit same to be towed to location, thus obviating any need to mount propulsive means on said foundation 6. As towing bits are well-known in the art, I have not shown them on any of the drawings. Guide columns 5 extend upwardly from foundation 6 and terminate at flared ends 107 in a common horizontal plane (Fig. 6). Access trunks 12 are of length sufficient to reach above the upper deck 8 of platform 4 when foundation 6 is grounded. Members 108 and 109 are secured to, and rigidly brace, guide columns 5, access trunks 12 and foundation 6.

Figure 5:
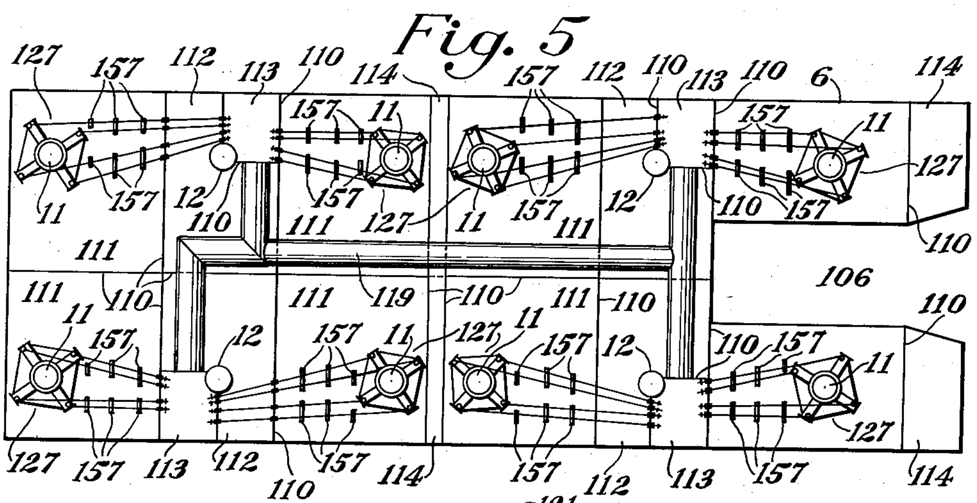
Fig. 5 represents a section in plan of the foundation, taken along the line 5—5 of Fig. 2.

Watertight bulkheads 110 define (Fig. 5), in foundation 6, primary ballast compartments 111 designed to withstand only nominal pressures, and secondary ballast compartments 112, pump rooms 113, and permanently buoyant compartments 114, said last three compartments being designed to withstand at least a 100 ft. head of water.

Primary ballast compartments 111 are ballasted with sea water. Each of said primary ballast compartments 111 is provided with a vent hatch 115 comprising hatch coaming 116, hinged counterweighted top 117 and lock 118. When foundation 6 is afloat, vent hatches 115 are closed to prevent water from high waves entering empty primary ballast compartments 111. When foundation 6 is to be submerged, vent hatches 115 are opened and kept open by means of the counterweights on top 117, so that primary ballast compartments 111 will always be in communication with the sea when foundation 6 is submerged. Thus, the walls of the primary ballast compartments 111 are never subjected to substantially unbalanced pressures. It is apparent that primary ballast compartments 111 can only be deballasted when hatch coamings 116 break water.

Secondary ballast compartments 112 are ballasted with, and provide storage for, fresh water. Ballast and vent piping for these secondary ballast tanks 112 are run, through access trunks 12, to the operating platform 4.

The permanently buoyant compartments 114 may be made ballastable, either with fresh water or with sea water, in which instance the vent piping would be run, through access trunks 12, to the operating platform 4.

Primary ballast compartments 11 are preferably proportioned to be capable, when empty, of buoyantly supporting mobile drilling platform 1 even when the several other compartments are carrying ballast.

Swash bulkheads are provided in the several ballastable compartments to reduce the free surface effect of the ballast, and are so well-known that it is believed to be unnecessary to show them.

Each pump room 113 serves its adjacent primary ballast compartments 111 and secondary ballast compartment 112. Tunnels 119 permit communication among the several pump rooms 113 in foundation 6. Each access trunk 12 is secured to foundation 6 adjacent a pump room 113. Thus a man can enter access trunk 12 near the level of operating platform 4 through one of several watertight doors 120 vertically spaced along said access trunk 12, can descend ladder 121 in said access trunk 12, and can enter pump room 113 through water tight door 122 near the bottom of said access trunk 12. Landings 123 are vertically spaced along access trunk 12, interiorly thereof.

The ballast piping systems for primary ballast compartments 111 and secondary ballast compartments 112, and for compartments 114 when they are to be made ballastable, comprising sea chests, pumps, valves, and pipes, are so well-known in this and related arts that a description thereof would serve only to add unnecessary detail to the drawings and specification, and can therefore be dispensed with.

Only under ideal conditions will piles 11 be embedded in the marine floor parallel to each other. It is more than likely that the several piles 11 will be skew to each other. In such a situation, if piles 11 were snugly mounted in guide columns 5, foundation 6 might hang on the piles 11, and thus said foundation 6 would be incapable of descending to the marine floor 3. For this reason, close clearance of piles 11 in guide columns 5 is purposely not provided. However, after foundation 6 has been engaged with the marine floor 3, horizontal movement of piles 11 in guide columns 5 is restricted by upper clamping means 124 mounted about guide columns 5 just below flared ends 107, braced by plates 125 and 126, and operable from the adjacent access trunk 12, and lower clamping means 127 mounted about guide columns 5 near the bottoms thereof, braced by plates 128 and 129, and operable from the adjacent pump room 113.

Figures 30, 31, 32:
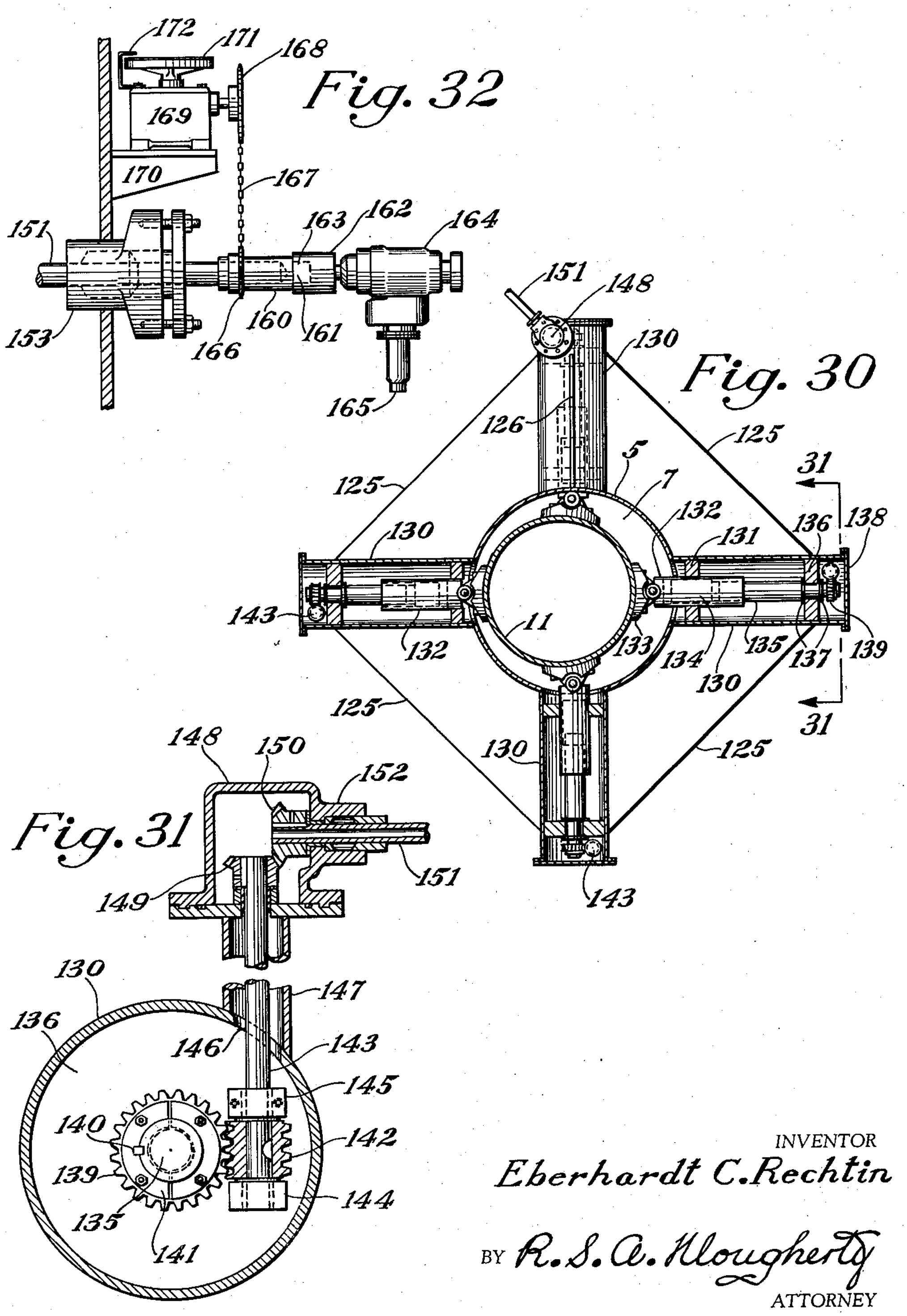
Fig. 30 represents a section in plan, taken along the line 30—30 of Fig. 6, showing the upper clamping means, but equally applicable to the lower clamping means.
Fig. 31 represents a section in elevation, taken along the line 31—31 of Fig. 30, showing the clamp housing and miter box, and the gearing associated therewith.
Fig. 32 represents a view in elevation of the clamp operator's station in a pump room or access trunk.

Upper clamping means 124 and lower clamping means 127 each comprise, at each guide column 5, four clamp housings 130 spaced about the circumference of, and perforating, said guide column 5, and extending outwardly therefrom (Fig. 30).

Near the inner end of, and inside, each clamp housing 130 is mounted sleeve-bearing plate 131. An internally threaded sleeve 132 is slidably and non-rotatably mounted, by means of any one of several well-known types of key, in said sleeve-bearing plate 131. Clamp palm 133, with a cylindrical face of substantially the same radius of curvature as pile 11, is mounted, for pivotal movement about a vertical axis, to sleeve 132. Threaded section 134 of clamp screw 135 is screwed into sleeve 132. Near the outer end of, and inside, clamp housing 130 is mounted thrust block 136. Clamp screw 135 is rotatably mounted in thrust block 136, and by means of collars 137 secured to clamp screw 135 and bearing against both faces of thrust block 136, said clamp screw 135 is prevented from sliding in or out of said thrust block 136. Thus, when clamp screw 135 is rotated, sleeve 132 will slide towards or away from guide column 5, thus advancing or retracting clamp palm 133 into or out of engagement with pile 11. The pivotal mounting of clamp palm 133 compensates for eccentric positioning of pile 11 relative to guide column 5. The outermost end of clamp housing 130 is closed by means of bolted cover plate 138.

Worm gear 139 is non-rotatably and non-slidably mounted to clamp screw 135 near the outer end thereof, by means of key 140 and split-washer 141, the latter being positioned in a circumferential slot in clamp screw 135 and, further, being screwed to worm gear 139. Worm 142 is keyed to vertically disposed shaft 143, between pillow block 144 and split pillow block 145, and engages worm gear 139. Pillow block 144 and split pillow block 145 are fastened, as by welding, to the outer face of thrust block 136. Shaft 143 passes through hole 146 in clamp housing 130, through flanged pipe stand 147 mounted on said clamp housing 130, and terminates in miter gear box 148 which is bolted to the flange of pipe stand 147 (Fig. 31). Miter gear 149 is secured to the top end of shaft 143. Miter gear 150, engaging miter gear 149, is secured to shaft 151 which passes out of miter gear box 148 through sleeve 152.

As shown in Fig. 6, upper clamping means 124 are operated from within access trunks 12, and lower clamping means 127 are operated from within pump rooms 113. Stuffing boxes 153, mounted in the walls of access trunks 12, rotatably receive shafts 151 associated with upper clamping means 124 (Fig. 32). Similarly, stuffing boxes 153, mounted in the walls of pump rooms 113, rotatably receive shafts 151 associated with the lower clamping means 127. Inspection of the drawings will reveal that clamp housings 130 have been so oriented about guide columns 5, and miter gear boxes 148 so positioned on pipe stands 147, that shafts 151 pass clear of said guide columns 5 and said miter gear boxes 148.

Shafts 151, which may be in one piece or in sections suitably joined together, are supported at spaced intervals in split pillow blocks 154. Split pillow blocks 154, receiving shafts 151 associated with upper clamping means 124, can be supported, through members 155 and 156, on members 108. Split pillow blocks 154, receiving shafts 151 associated with lower clamping means 127, can be supported, through members 157 and 158, off the bottom of primary ballast compartments 111. Where shafts 151 must pass through watertight bulkheads 110 separating primary ballast compartments 111 from secondary ballast compartments 112, stuffing boxes 159 are provided.

A collar 160, having a square male end 161, is secured to that end of shaft 151 that projects into access trunk 12 or pump room 113. An adaptor 162, having a square female opening 163 formed therein and matching male end 161, is secured to the armature of air motor 164 operated by air hose 165.

In order to advance or retract a particular clamp palm 133, adaptor 162 is placed over that collar 160 associated with said clamp palm 133 (Fig. 32), so that male end 161 engages female opening 163, and air motor 165 is started in the desired direction of rotation. After said clamp palm 133 is satisfactorily positioned, adaptor 162 can be removed and engaged with another collar 160 associated with another clamp palm 133.

It is desirable that the position of each clamp palm 133 in each guide column 5 be known, in order to properly adjust upper clamping means 124 and lower clamping means 127 about piles 11. Therefore, sprocket 166 is secured to collar 160, and drives sprocket chain 167 which, in turn, drives sprocket 168 secured to input shaft of gear reductor 169. Said gear reductor 169 is mounted on a bracket 170 which is secured to the wall of access trunk 12 or to the water-tight bulkhead 110 in pump room 113. Indicator dial 171 is secured to output shaft of said gear reductor 169. Pointer 172, mounted to gear reductor 169, reads on the graduations of indicator dial 171. The reduction ratio of gear reductor 169 is so chosen that when clamp palm 133 travels from its fully retracted position to its maximum advanced position, indicator dial 171 will make one complete revolution, thus indicating the exact position of clamp palm 133 at all times.

Air motor 164 and gear reductor 169 need not be described in detail as both are regularly manufactured, the former by the Chicago Pneumatic Tool Co., among others, and the latter by the Boston Gear Works among others.

Cylinders 173, designed to withstand at least a 100 ft. head of water, may be mounted through brackets 174 to foundation 6 to provide additional fresh water storage facilities and to enhance the transverse floating stability of foundation 6 through increased water plane area. The manner of piping up these cylinders 173, comprising pumps in pump rooms 113 and water and vent piping running from said cylinders 173 up through access trunks 12 to operating platform 4, is so well-known as to obviate any need for a detailed description thereof.

Figure 16:
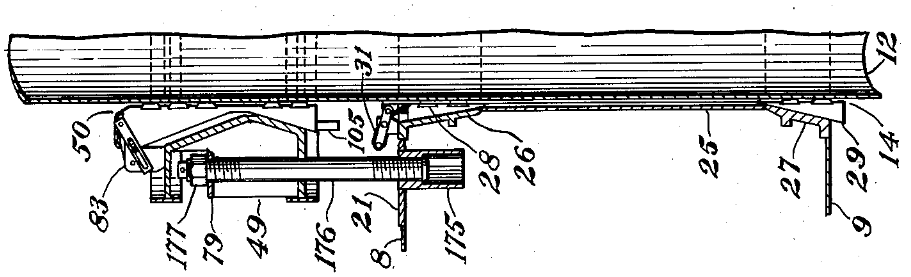
Fig. 16 represents a half-section taken along the line 13—13 of Fig. 12, and shows one of the two staybolts used to mechanically tie off the operating platform to an access trunk.
Figure 13:
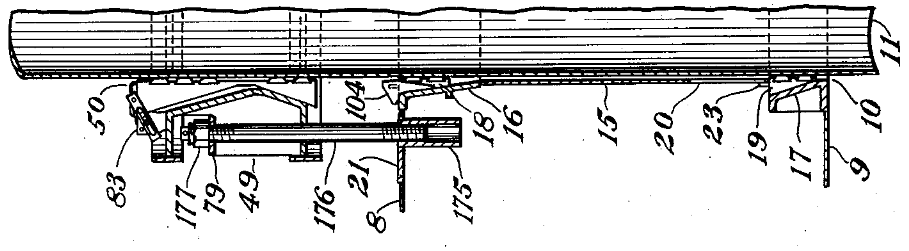
Fig. 13 represents a half-section taken along the line 13—13 of Fig. 12, and shows one of the two staybolts used to mechanically tie off the operating platform to a pile.

Means to mechanically tie off operating platform 4 to piles 11 and access trunks 12 are provided, and comprise a pair of threaded staybolt sockets 175 associated with each gripping means 47 and secured to upper deck 8 of operating platform 4, and a threaded staybolt 176 for each staybolt socket 175 (Figs. 13 and 16). It will be noted that, when operating platform 4 is supported on piles 11 and access trunks 12, double-wedges 50 are in their uppermost position with lower wedge segments 86 engaged. Staybolts 176 can now be threaded up through staybolt sockets 175, and be passed through lower flanges 80 and plates 79 of annular yokes 49, and threaded into nuts 177. Thus, the pressure in hydraulic rams 48 can be relieved, and operating platform 4 will be held by nuts 177 bearing down against the upper face of plates 79.

Figure 3:
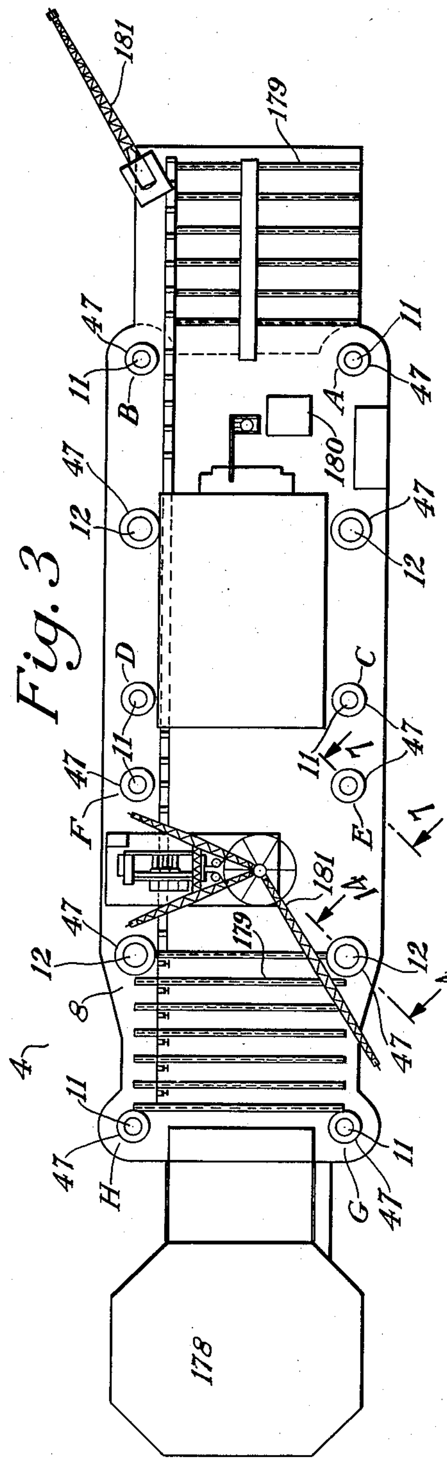
Fig. 3 represents a view in pan of the operating platform.

Operating platform 4 may be equipped as desired. I prefer to install (Fig. 3) helicopter landing platform 178, pipe racks 179, derrick 180 and cranes 181 as shown.

A skirted hood 182 is mounted to the top of each access trunk 12 to prevent rain water from flooding same yet permitting the free circulation of air between the atmosphere and the interior of said access trunks.

The operation of mobile drilling platform 1 will now be described.

Mobile drilling platform 1 is towed to the drilling site, with operating platform 4 supported, well above the crests of any waves reasonably to be expected, on flared ends 107 of guide columns 5, so that said operating platform 4 and foundation 6 are in vertically closed relationship. Piles 11 are held in a raised position (Fig. 7). The following tabulation applies:

| | |
|---|---|
| Double-wedges 50 at piles 11 | In lowermost position with upper wedge segments 84 engaged. |
| Wedges 18 and 19 at piles 11 | Engaged. |
| Double-wedges 50 at access trunks 12 | In lowermost position with wedge segments 84 engaged. |
| Wedges 28 at access trunks 12 | Removed. |
| Wedges 29 at access trunks 12 | Engaged. |
| Upper and lower clamping means 124 and 127 | Engaged. |
| Primary ballast compartments 111 | Empty. |

At the drilling site, annular yokes 49 at piles 11 are raised slightly, thus raising piles 11 and disengaging wedgs 18 and 19. These wedges 18 and 19 are then removed from yokes 16 and 17 respectively. Upper and lower clamping means 124 and 127 are retracted slightly so as to provide some small clearance between piles 11 and clamp palms 133.

Figure 9:
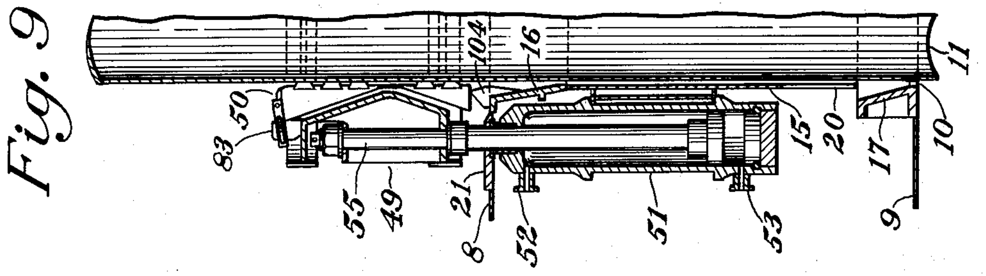
Fig. 9 represents a half-section similar to Fig. 8 and shows the double-wedge in its neutral position, whereby the weight of the pile causes it to drop to the marine floor.
Figure 8:
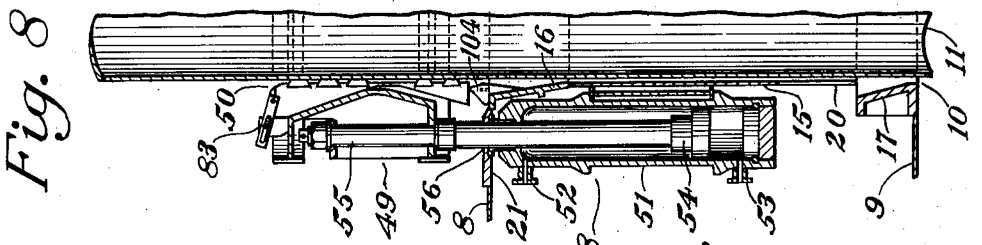
Fig. 8 represents a half-section similar to Fig. 7, and shows the lowered yoke, and the double-wedge about to be sprung out of its lowermost position just before the pile is dropped.

Annular yokes 49 at piles 11 are lowered slightly past the point at which the bottoms of double-wedges 50 engage fingers 104, so that upper wedge segments 84 are disengaged and double-wedges 50 are not yet sprung into their uppermost position (Figs. 8 and 9). Piles 11 will then drop to, and become partially embedded in, marine floor 3. I prefer to drop all piles 11 simultaneously. Annular yokes 49 at piles 11 are now lowered still further to spring said double-wedges 50 into their uppermost position.

Figure 10:
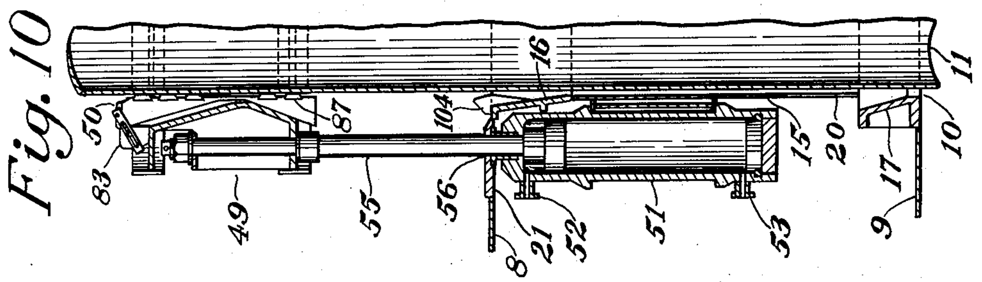
Fig. 10 represents a half-section similar to Fig. 7, and shows the double-wedge sprung into its uppermost position, and the yoke raised in preparation for a downward pile-pushing stroke.
Figure 11:
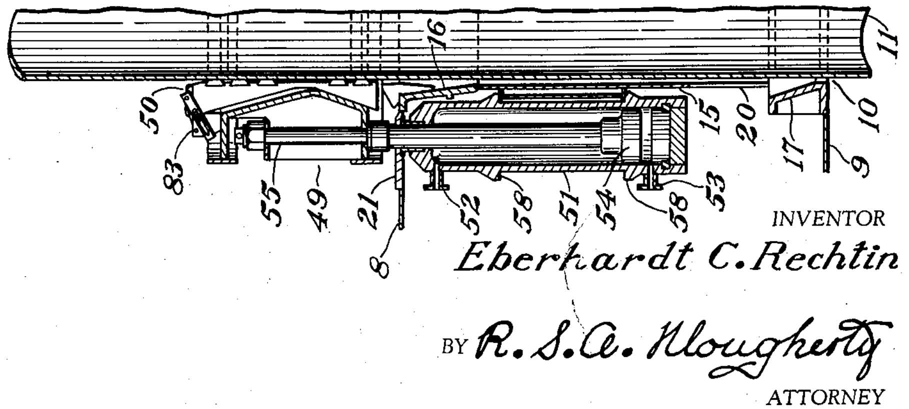
Fig. 11 represents a half-section similar to Fig. 10, and shows the yoke about to be raised through an upward ratcheting stroke in preparation for another downward pile-pushing stroke.

Piles 11 are embedded in marine floor 3 by utilizing the available weight of mobile drilling platform 1. Actually, this procedure will not be one of "driving" in the sense usually understood, as no impact or inertia forces are used. Rather, the procedure is one of "loading" the piles 11 and pushing same down until they will support the structure with a reasonable margin of safety. Annular yokes 49 at piles 11 are each put through a two-step cycle, consisting of raising said annular yokes 49 (Fig. 10) and lowering said annular yokes 49, with a resulting ratcheting effect as has already been described. On the upward stroke of said cycle (Fig. 11), double-wedges 50 being in their uppermost position will slide up piles 11 without transmitting any vertical forces thereto. On the downward step of said cycle, lower wedge segments 86 of double-wedges 50 will engage and force down piles 11 as foundation 6 rises in the water 2 and loses some of its buoyancy.

In order to have uniform loading on piles 11 and to maintain close control over the pile-embedding operation, two diagonally opposite pairs of piles 11 will be embedded together, and will be pushed down alternately with the other two pairs of piles 11. Thus, referring to Fig. 3, the order will be as follows: push down on piles 11 at stations A, D, E and H, then push down on piles 11 at stations B, C, F and G, and repeat until the desired penetration is achieved. The advantage in driving two pairs of piles 11 alternately with the other two pairs of piles 11 (as opposed to completely embedding two pairs of piles 11 before starting to drive the other two pairs of piles 11, or driving all eight piles 11 simultaneously) is that mobile drilling platform 1 is prevented from settling back in the water between "grabs" on piles 11. When two pairs of annular yokes 49 reach the lower end of their stroke they are kept in that position while the other two pairs of annular yokes 49 are raised and lowered through a cycle. Thus, the weight developed by raising mobile drilling platform 1 is not lost at the end of each pushing stroke. As piles 11 penetrate marine floor 3 more force is required to further embed them. This increase in force is provided automatically. As two pairs of annular yokes 49 go through a downward, pushing stroke, the increased resistance of marine floor 3 to pile penetration will result in mobile drilling platform 1 being lifted further out of water 2, with a greater loss in buoyancy of foundation 6, thus increasing the pushing force, until the weight of mobile drilling platform 1 not supported by the buoyancy of foundation 6 equals the force required to embed piles 11. Said further lifting of mobile drilling platform 1 is possible because of the ratcheting effect of double-wedges 50 in those annular yokes 49 held stationary. Embedment of piles 11 is continued until the pushing force indicates sufficient penetration of marine floor 3 has been achieved. This pushing force can easily be determined from the pressure in cylinders 51. All annular yokes 49 at piles 11 can now be placed at the bottom of their stroke, and operating platform 4 is thus secured to piles 11.

Figure 15:
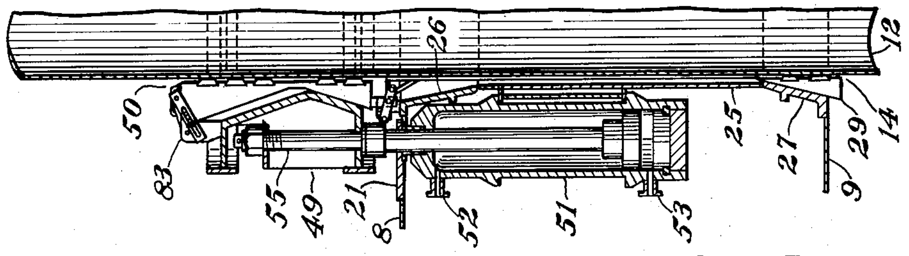
Fig. 15 represents a half-section similar to Fig. 14, and shows the yoke about to be raised through an upward ratcheting stroke in preparation for another downward pushing stroke on the access trunk.
Figure 14:
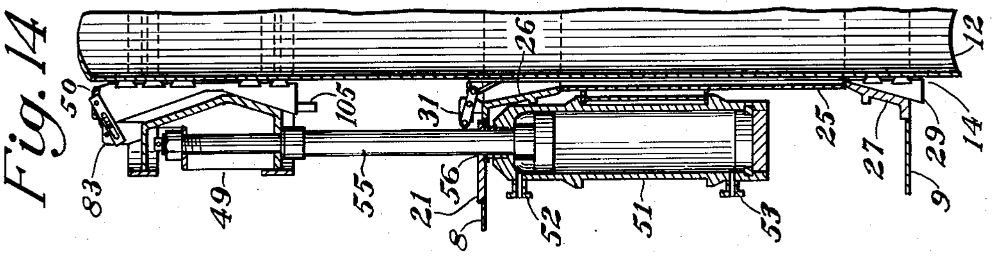
Fig. 14 represents a half-section taken along the line 14—14 of Fig. 3, and shows the double-wedge sprung into its uppermost position, and the yoke raised in preparation for a downward pushing stroke on the access trunk.

I prepare to submerge foundation 6 to marine floor 3 by springing double-wedges 50, in annular yokes 49 at access trunks 12, into their uppermost position, and by fully retracting upper and lower clamping means 124 and 127. Primary ballast compartments 111 are now flooded. It is desirable to maintain control over foundation 6 and to expedite the flooding of primary ballast compartments 111 by lowering annular yokes 49 at access trunks 12, thus pushing down on said access trunks 12 in substantially the same manner as described in connection with embedding piles 11. This latter operation (pushing down access trunks 12), and the engagement of wedges 29, prevent foundation 6 from being lifted and tossed about by swells. I prefer to limit the amount of water in compartments 112 and 114 and cylinders 173, so that the remaining buoyancy of compartments 112, 113 and 114 and cylinders 173 will be at least slightly in excess of the dead weight of foundation 6 and access trunks 12. Thus, with primary ballast compartments 111 flooded, foundation 6 will float with reduced freeboard. Foundation 6 is preferably submerged to marine floor 3 in this condition of buoyancy (viz., net positive buoyancy). Accordingly, I accomplish the actual submersion of foundation 6 by pushing down on access trunks 12 (Fig. 14). Annular yoke 49 at any access trunk 12 is desirably operated independently of the other annular yokes 49 at the other access trunks 12, to maintain close control over the trim of foundation 6. Wedges 29 being engaged, they will prevent foundation 6 from rising, due to its net positive buoyancy, as annular yokes 49 at access trunks 12 are raised through a ratcheting stroke in preparation for another downward pushing stroke (Fig. 15). These wedges 29 should be disengaged just before foundation 6 reaches marine floor 3. Foundation 6 can also be submerged to marine floor 3 in a condition of net negative buoyancy by so adding water to compartments 112 and 114 and cylinders 173 that the dead weight of foundation 6 and access trunks 12 will be in excess of the remaining buoyancy of compartments 112, 113 and 114, cylinders 173 and the buoyancy corresponding to the displacement of the steel of foundation 6. Submergence of foundation 6 to marine floor 3 in this condition of net negative buoyancy can also be expedited by pushing down on access trunks 12.

Foundation 6 is firmly seated on marine floor 3 by pushing down access trunks 12, gripping means 47 at access trunks 12 operating against the force of embedment of piles 11 in marine floor 3. Thus, additional support for operating platform 4 is developed through the direct bearing of said foundation 6 on marine floor 3.

Staybolts 176 are installed, as previously described, at all piles 11 and access trunks 12. Hydraulic pressure in all cylinders 51 can now be released and operating platform 4 will hang on staybolts 176. Upper and lower clamping means 124 and 127 are extended until clamp palms 133 approach piles 11 with small clearance. Wedges 18 and 19 at piles 11 and wedges 28 at access trunks 12 are placed in their respective yokes 16, 17 and 26. Mobile drilling platform 1 is now in the vertically extended position, and drilling operations can be commenced.

In suitably firm solis, compartments 112 and 114 and cylinders 173 can be filled to capacity with water. In this condition, operating platform 4 is supported partly by the skin friction of piles 11 in the marine floor 3, and partly by the direct bearing of foundation 6 on marine floor 3. In poorer soils having lower values of allowable bearing, it may be necessary to set an upper limit to the amount of water in compartments 112 and 114 and cylinders 173 to reduce the bearing of foundation 6 on marine floor 3, or even to maintain said foundation 6 in a positively buoyant state so that operating platform 4 is supported partly by the skin friction of piles 11, partly by the direct bearing of foundation 6, and partly by the buoyancy of foundation 6.

In inclement weather, it is desirable to extend upper and lower clamping means 124 and 127 until clamp palms 133 contact piles 11.

When it is desired to relocate mobile drilling platform 1 to another drilling site, said mobile drilling platform 1 must be brought from the vertically extended to the vertically closed position.

The first step is to raise foundation 6 and in preparation therefor, hydraulic pressure in cylinders 51 is restored and the weight of operating platform 4 is transferred from staybolts 176 to piston rods 55. Staybolts 176 are removed. Wedges 29, as previously noted, are in their lowermost, or disengaged, position. Upper and lower clamping means 124 and 127 are fully retracted. Double-wedges 50 at access trunks 12 are sprung into their lowermost position.

Figure 18:
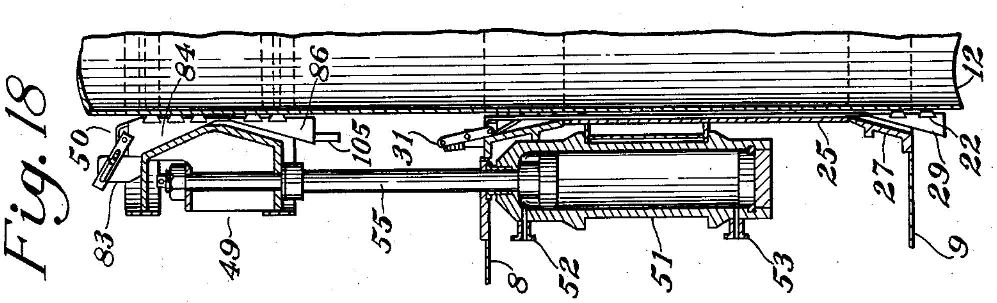
Fig. 18 represents a half-section similar to Fig. 17, and shows the yoke about to be lowered through a downward ratcheting stroke in preparation for another upward pulling stroke on the access trunk.
Figure 17:
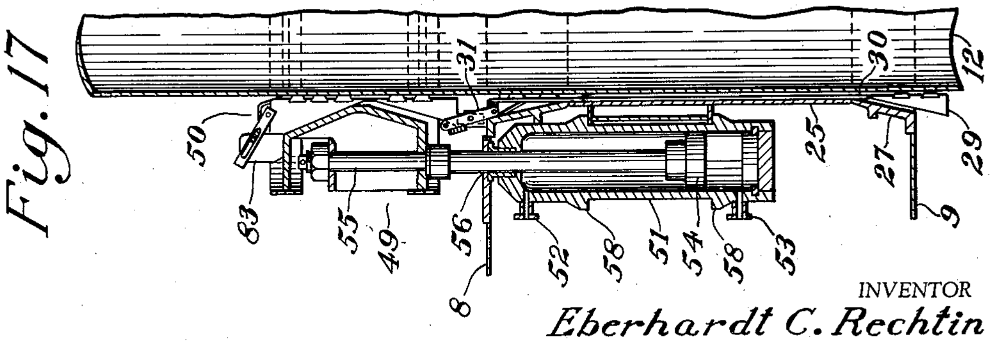
Fig. 17 represents a half-section taken along the line 14—14 of Fig. 3, and shows the double-wedge sprung into its lowermost position, and the yoke lowered in preparation for an upward pulling stroke on the access trunk.

Annular yokes 49 at access trunks 12 are now put through a two-step cycle comprising an upward or pulling stroke (Fig. 17) and a downward or ratcheting stroke (Fig. 18). Annular yoke 49 at any access trunk 12 is operated independently of other annular yokes 49 at other access trunks 12 to maintain control over the trim of foundation 6. Some water can be removed from compartments 112 and 114 and cylinders 173 to make foundation 6 positively buoyant, and the latter can be raised in this condition so that the buoyancy augments the lifting force of annular yokes 49 at access trunks 12. I prefer to raise foundation 6 in a non-buoyant state, and accordingly I adjust the amount of water in compartments 112 and 114 and cylinders 173 to make said foundation 6 at least slightly negatively buoyant. In this latter state, wedges 28 at access trunks 12 act as ratchets to hold foundation 6 as annular yokes 49 at access trunks 12 are lowered through a ratcheting stroke in preparation for another upward pulling stroke on said foundation 6 against the force of embedment of piles 11 in marine floor 3.

When foundation 6 reaches the surface of water 2, and coamings 116 of vent hatches 115 break water, annular yokes 49 at access trunks 12 can be lowered and there held stationary, and deballasting of primary ballast compartments 111 is commenced. As deballasting continues, foundation 6 will rise further out of the water 2. Wave action will be dampened by wedges 28 acting as ratchets and preventing foundation 6 from falling back after it has been raised by swells. When guide columns 5 approach lower deck 9 of operating platform 4, annular yokes 49 at access trunks 12 are raised to pull up the foundation 6 so that flared ends 107 of said guide columns 5 contact lower deck 9, and said annular yokes 49 are held in this position until deballasting of primary ballast compartments 111 is completed. Wedges 29 at access trunks 12 are raised into their upper, or engaged, position.

It is to be noted that wedges 28 at access trunks 12 should never be in yokes 26 when mobile drilling platform 1 is in a vertically closed position, because upward movement of access trunks 12 is required to disengage these wedges 28 when it is desired to remove same. Consequently, shortly before flared ends 107 of guide columns 5 contact lower deck 9 of operating platform 4, these wedges 28 are removed.

After deballasting of primary ballast compartments 111 is completed, the weight of operating platform 4 is transferred from piles 11 to floating foundation 6 by raising slightly all annular yokes 49 at piles 11. Double-wedges 50 at piles 11 are sprung into their lowermost position, and annular yokes 49 associated therewith are then lowered in preparation for loosening and pulling piles 11. Upper and lower clamping means 124 and 127 are extended until clamp palms 133 approach, with small clearance, piles 11.

It will be recalled that, in embedding piles 11, it was necessary to lift foundation 6 partially out of water 2 in order to develop sufficient downward force. In loosening and pulling piles 11, it will be necessary to develop sufficient upward force by pushing foundation 6 further into water 2 to increase its buoyancy.

The first step in extracting piles 11 is to loosen same by raising annular yokes 49 at piles 11. I prefer to loosen piles 11 in the following sequence: A and H, B and G, C and F, and finally D and E.

Figure 20:
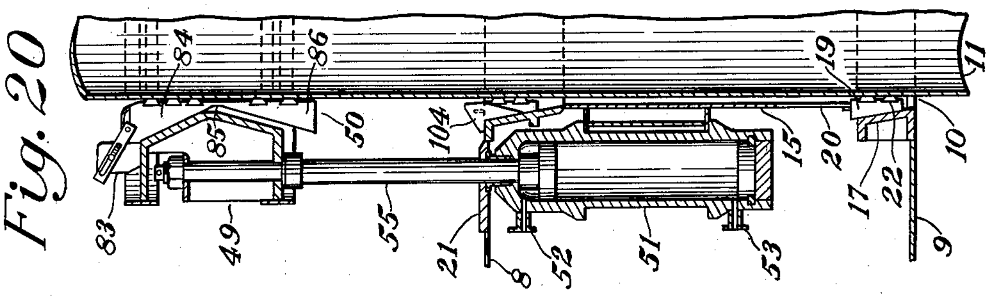
Fig. 20 represents a half-section similar to Fig. 19, and shows the yoke about to be lowered through a downward ratcheting stroke in preparation for another upward pile-pulling stroke.
Figure 19:
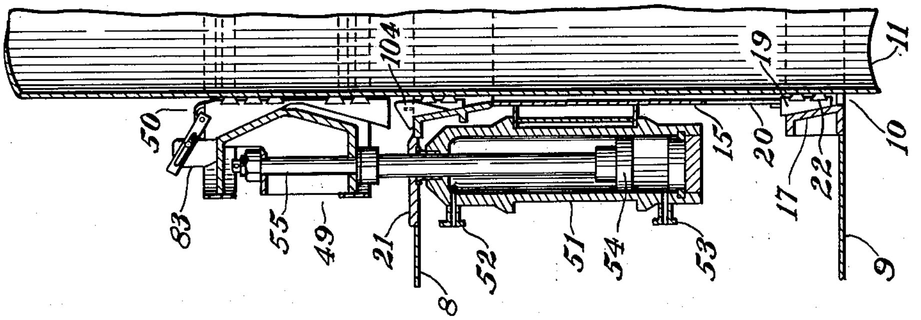
Fig. 19 represents a half-section taken along the line 7—7 of Fig. 3, and shows the double-wedge sprung into its lowermost position, and the yoke lowered in preparation for an upward pile-pulling stroke.

After the pile loosening operation, the extraction of piles 11 from marine floor 3 is commenced. In a sequence similar to that for embedding piles 11, I prefer to pull up (Fig. 19) on two diagonally opposite pairs of piles 11 alternately with the other two diagonally opposite pairs of piles 11. Thus, referring to Figure 3, the order will be as follows: pull up on piles 11 at stations A, D, E and H, then pull up on piles 11 at stations B, C, F and G, and repeat until the piles 11 have been withdrawn from marine floor 3. Wedges 18 and 19 at piles 11 act as ratchets and prevent said piles 11 from falling back as annular yokes 49 at said piles 11 are lowered through a ratcheting stroke in preparation for another upward pulling stroke (Fig. 20). Piles 11 are to be raised to whatever height is necessary to clear marine floor 3 while mobile drilling platform 1 is enroute to the next drilling site. For greatest stability, it is desirable to keep piles 11 as low as possible but, if necessary, they can safely be raised flush with the bottom of foundation 6. Upper and lower clamping means 124 and 127 are extended until clamp palms 133 contact piles 11.

Figure 33:
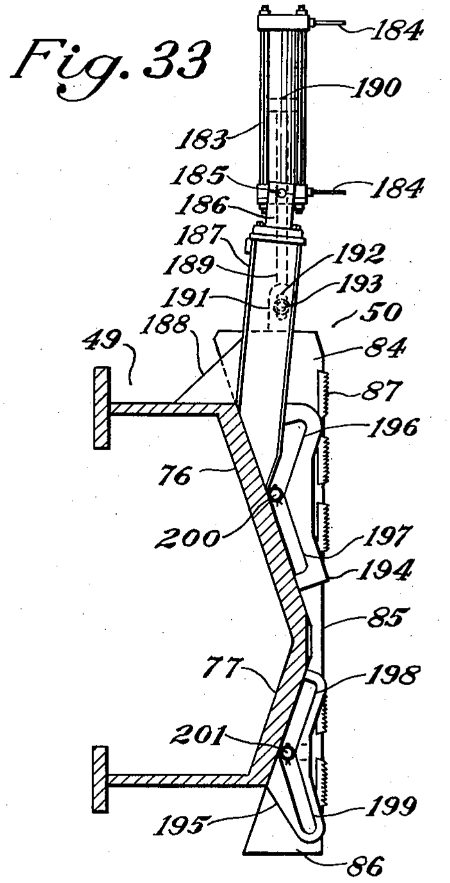
Fig. 33 represents a view in elevation of a modified double-wedge positioner.
Figure 34:
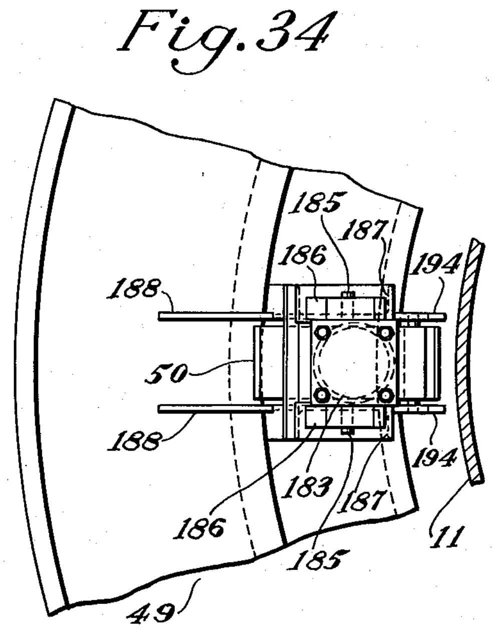
Fig. 34 represents a view in plan of the modified double-wedge positioner.

A modified double-wedge positioner is shown in Figs. 33 and 34, and comprises air cylinder 183, served by air hose 184, and pivotally mounted in trunnion fashion, by means of pins 185, to split pillow blocks 186, the latter in turn being supported above annular yoke 49, over double-wedge 50, by means of members 187 and gusset plates 188. Piston rod 189 is connected at its upper end to piston 190. Spaced lugs 191, with slotted openings 192 formed therein, are secured to the top of double-wedge 50. Pin 193 is passed through slotted openings 192 and through the lower end of piston rod 189 which is positioned between said spaced lugs 191.

Spaced pairs of upper guides 194 and lower guides 195, the guides 194 and 195 of each pair being set apart sufficiently to receive a double-wedge 50, may be secured to yokes 49. Upper guides 194 are preferably formed with a doubly-inclined opening comprising upper slope 196 and lower slope 197. Similarly, lower guides 195 are preferably formed with a doubly-inclined opening comprising upper slope 198 and lower slope 199. Pins 200 and 201 are secured to upper and lower wedge segments 84 and 86 respectively, and are received in doubly-inclined openings of upper and lower guides 194 and 195 respectively. Upper slopes 196 and 198 are parallel to the adjacent element of conical section 77. Lower slopes 197 and 199 are parallel to the adjacent element of conical section 76.

Figure 24:
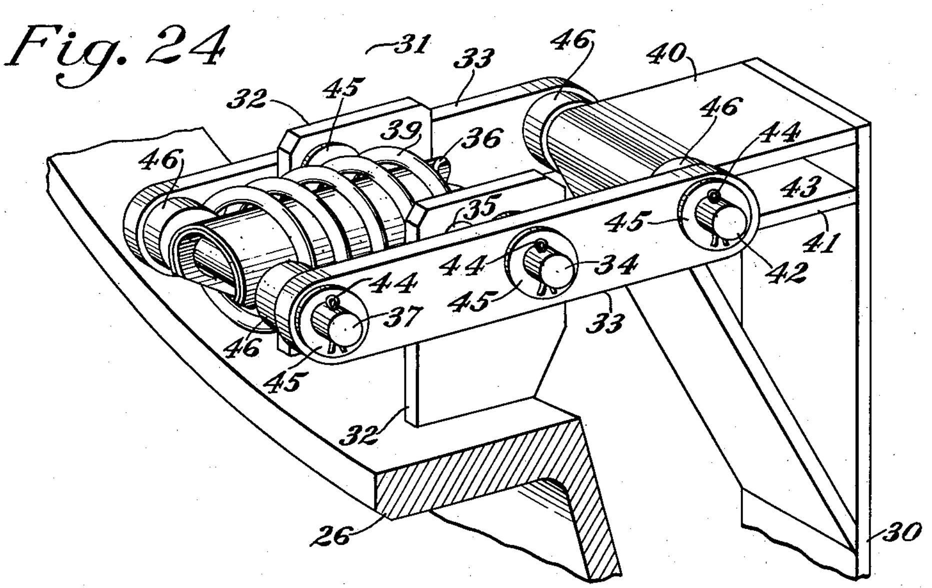
Fig. 24 represents an isometric view of the wedge positioner of Fig. 23.

Figs. 33 and 24 show double-wedge 50 in the neutral position. It will be noted that flat segment 85 of double-wedge 50 is adjacent the smallest internal diameter of annular yoke 49, that pin 200 is at the apex of the angle formed by upper slope 196 and lower slope 197, and that pin 201 is at the apex of the angle formed by upper slope 198 and lower slope 199. It seems apparent that if pressure be increased in that section of air cylinder 183 below piston 190, double-wedge 50 will move upwardly and inwardly, pins 200 and 201 riding in upper slopes 196 and 198 respectively, thus placing lower wedge segment 86 into operative engagement, slotted openings 192 facilitating the ratcheting effect. Similarly, if pressure be increased in that section of air cylinder 183 above piston 190, double-wedge 50 will move downwardly and inwardly, pins 200 and 201 riding in lower slopes 197 and 199 respectively, thus placing upper wedge segment 84 into operative engagement, slotting openings 192 facilitating the ratcheting effect.

To maintain double-wedge 50 in a selected position where the modified double-wedge positioner above described is used, when it is desired to relieve the pressure in air cylinder 183, holes may be provided through said double-wedge 50 to receive a pin. It seems obvious that by properly locating one such hole in upper wedge segment 84 of said double-wedge 50, the latter may be held in its uppermost position by inserting a pin through said hole, the ends of said pin being adapted to bear down against the tops of upper guides 194 when said double-wedge 50 is lowered more than a predetermined maximum. Similarly, by properly locating a second hole in lower wedge segment 86 of said double-wedge 50, the latter may be maintained in its lowermost position by inserting a pin through said second hole, the ends of said pin being adapted to bear up against the bottoms of lower guides 195 when said double-wedge 50 is raised more than a predetermined maximum. To avoid adding unnecessary detail to Fig. 33, in view of the description of this obvious method, the aforementioned holes and pins have been omitted from said Fig. 33. Further, if this modification of wedge positioner is used, fingers 104 are eliminated from the design, as double-wedge 50 is raised or lowered relative to annular yoke 49 solely by the motive force of air cylinder 183.

Figure 35:
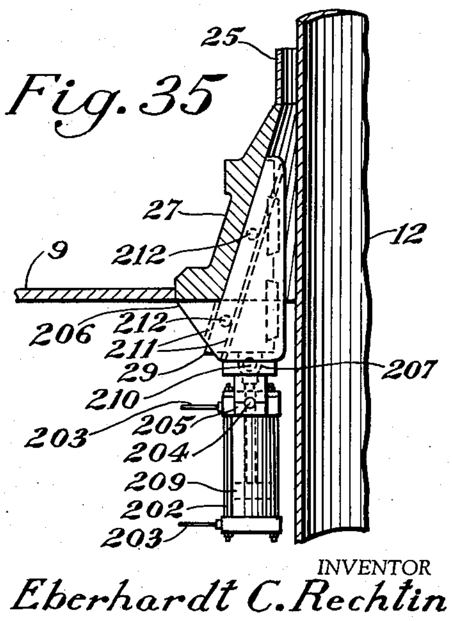
Fig. 35 represents a detail of a modification of the wedge positioner, and a wedge associated therewith, at the lower deck of the platform adjacent an access trunk, showing the wedge in its lower, or inoperative, position.
Figure 36:
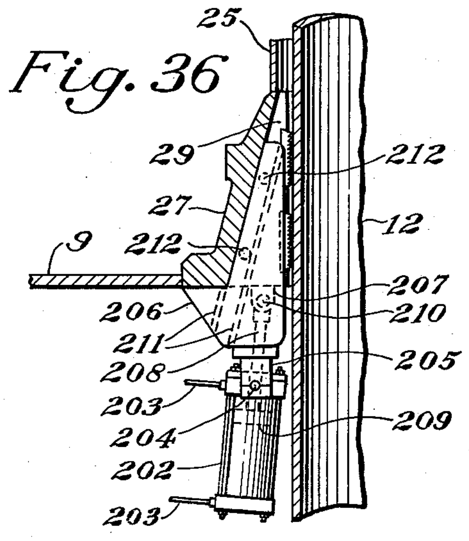
Fig. 36 is similar to Fig. 35, and shows the wedge in its upper, or operative, position.

A modified wedge positioner for use at the lower deck 9 adjacent an access trunk 12 is shown in Figs. 35 and 36, and comprises air cylinder 202, served by air hose 203, and pivotally mounted in trunnion fashion, by means of pins 204, to split pillow blocks 205. Spaced pairs of guides 206, the guides 206 of each pair being set apart sufficiently to receive a wedge 29, are secured to yoke 27. Each pillow block 205 is secured to one of said guides 206. Wedge 29 is provided with spaced lugs 207. Piston rod 208 is secured at its lower end to piston 209. Pin 210 is passed through the spaced lugs 207 and through the upper end of piston rod 208 which is positioned between said spaced lugs 207. Guides 211 are secured to that face of guide 206 adjacent wedge 29, and form a channel parallel to the adjacent element of yoke 27 to receive, and guide, pins 212, the latter being secured to wedge 29. It is apparent that by increasing the pressure in that section of air cylinder 202 below piston 209, wedge 29 can be raised into its upper, or operative, position, and by increasing the pressure in that section of air cylinder 202 above piston 209, wedge 29 can be lowered into its inoperative, or disengaged, position. It is to be noted that when wedge 29 is in its upper, or operative, position, and access trunk 12 is to move downwardly relative to yoke 27, the compressibility of the air in air cylinder 202 permits access trunk 12 to push wedge 29 down slightly to disengage the latter.

I show a further modification of my wedge positioner in Figs. 37–43. These figures disclose the modified wedge positioner in association with annular yoke 49 and pile 11, and are equally applicable in connection with access trunk 12.

Figures 37, 41, 42, 43:
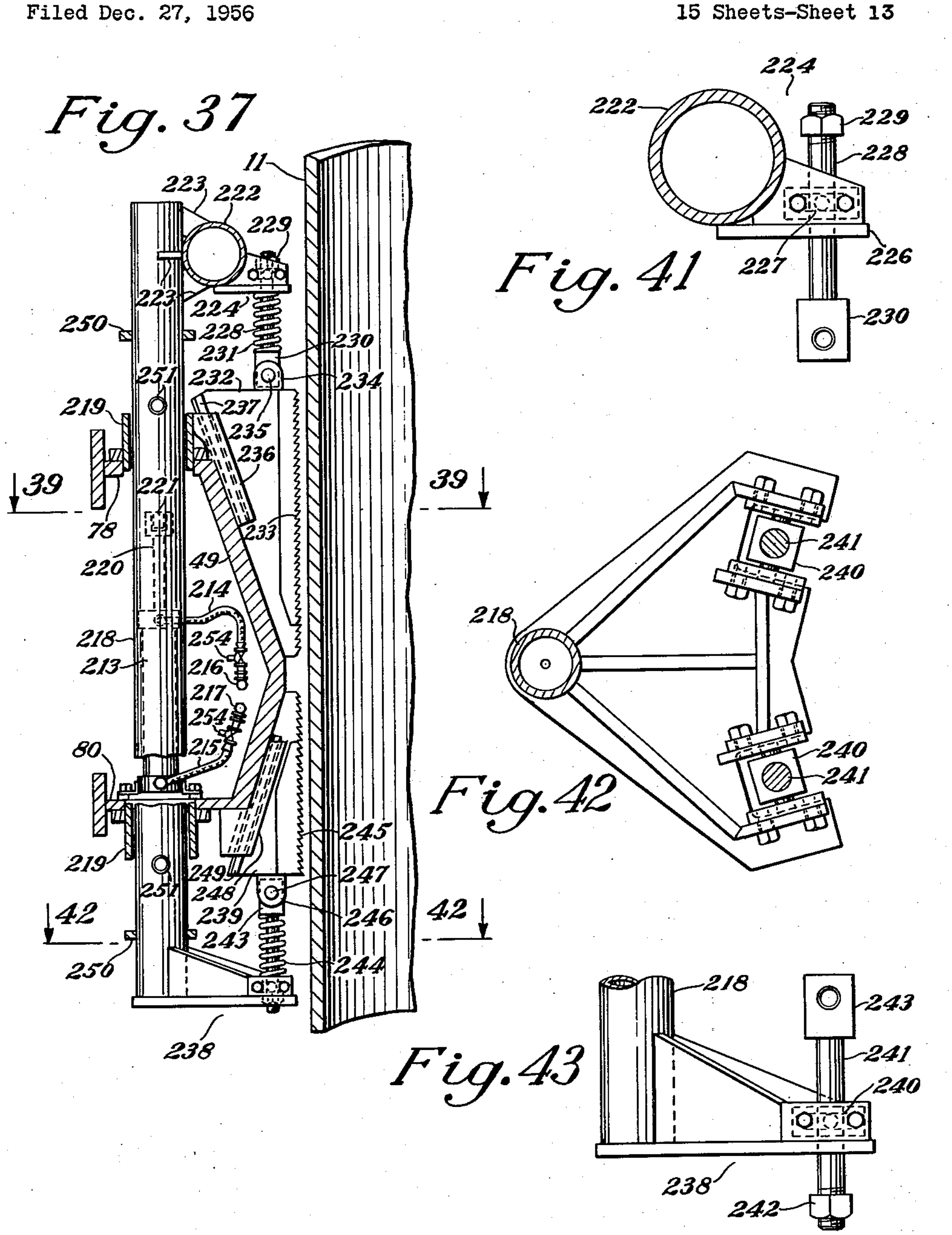
Fig. 37 represents a view in elevation of a further modification of the wedge positioner.
Fig. 41 represents a detail of the upper bracket assembly for the wedge positioner of Fig. 37, with the spring omitted for purposes of clarity.
Fig. 42 represents a section in plan, taken along the line 42—42 of Fig. 37, showing in detail the lower bracket assembly.
Fig. 43 represents a detail of the lower bracket assembly as viewed in elevation, with the spring omitted for purposes of clarity.
Figure 38:
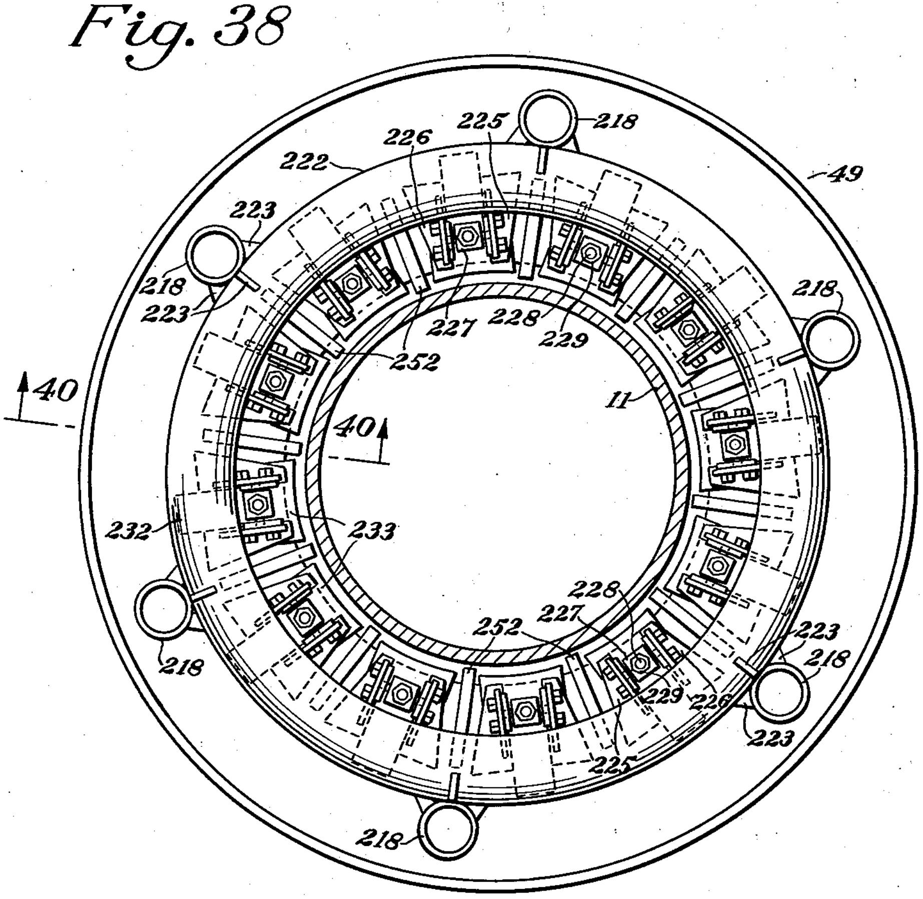
Fig. 38 represents a view in plan of the yoke used at the piles and access trunks, and shows the orientation of the modified wedge positioner of Fig. 37.
Figure 40:
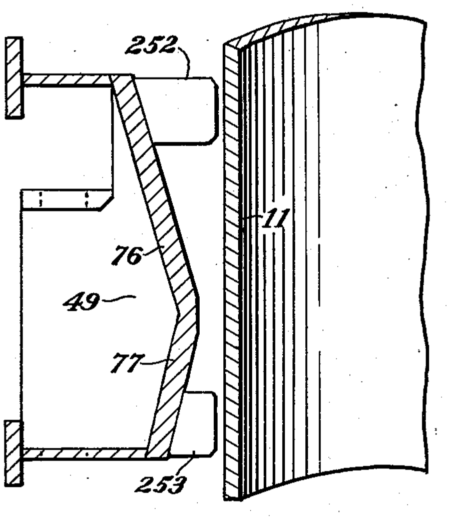
Fig. 40 represents a section in elevation, taken along the line 40—40 of Fig. 38, and shows the yoke guides for centering the yoke about the pile or access trunk received therein.
Figure 39:
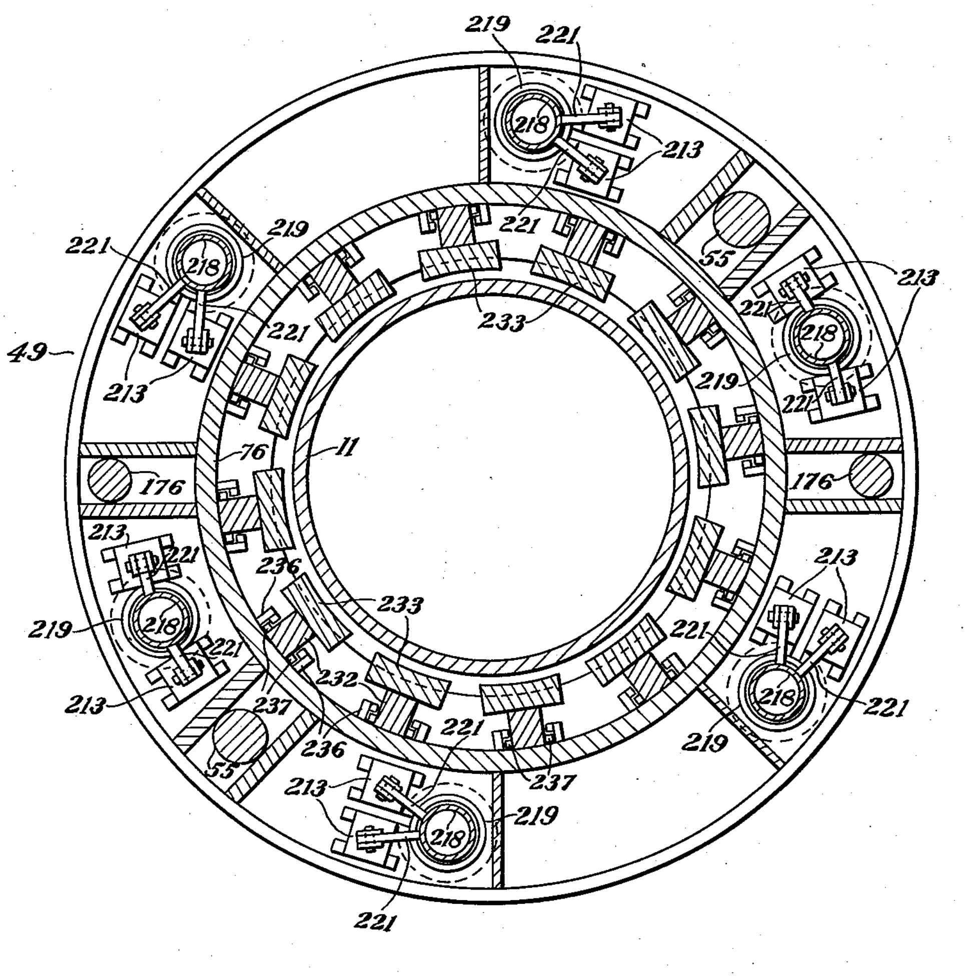
Fig. 39 represents a section in plan, taken along the line 39—39 of Fig. 37, and shows the orientation of the air cylinders actuating the wedge positioner of Fig. 37.

As shown in Figs. 37–43, several air cylinders 213 are secured to the yoke 49 as, for instance, to and above lower flange 80. Lines 214 and 215 serve those portions of each air cylinder 213 above and below, respectively, the piston (not shown) in said air cylinder 213. Lines 216 and 217 are indicated in Fig. 37, and run around (not shown) annular yoke 49 serving, respectively, all lines 214 and 215, and further, are connected to a suitable source of compressed air (not shown) for actuation of said air cylinders 213. Pipe guides 218 are vertically slidably mounted in collars 219, the latter extending through in secured relation to upper flange 78 and lower flange 80 of annular yoke 49. Pipe guides 218 are secured to piston rods 220 of air cylinders 213 by means of members 221. Wedge ring 222 is supported above annular yoke 49 by pipe guides 218, being secured to the latter by members 223. Spaced around wedge ring 222, and secured thereto, are upper bracket assemblies 224, one at each wedge location, and each comprising pieces 225 and 226. Block 227 is pivotally mounted to and between pieces 225 and 226, and slidably receives bar 228. Bar 228 is provided at its upper end, above block 227, with nut 229, and is secured at its lower end to block 230. Spring 231 is mounted around bar 228 in interposed relation between the top of block 230 and the bottom of block 227, so as to urge apart said blocks 230 and 227. Upper wedge 232, provided with enlarged face 233, has ears 234 pivotally mounted to block 230 by means of pin 235 extending through said ears 234 and block 230. Spaced members 236, secured to yoke 49 and with keyways formed therein, slidably receive keys 237 secured to upper wedge 232. Thus, upon actuation of air cylinders 213, upper wedge 232 is movable downwardly and inwardly (Fig. 37) into engagement between annular yoke 49 and pile 11, or outwardly and upwardly out of engagement. At the lower end of each pipe guide 218 is lower bracket assembly 238 simultaneously serving two lower wedges 239. Pivotally mounted to each lower bracket assembly 238 are two blocks 240, each of which slidably receives a bar 241. Each bar 241 is provided at its lower end, below block 240, with a nut 242, and is secured at its upper end to block 243. Spring 244 is mounted around bar 241 in interposed relation between the top of block 240 and the bottom of block 243, so as to urge apart said blocks 240 and 243. Lower wedge 239, provided with enlarged face 245, has ears 246 pivotally mounted to block 243 by means of pin 247 extending through said ears 246 and block 243. Spaced members 248 secured to yoke 49, and with keyways formed therein, slidably receive keys 249 secured to lower wedge 239. Thus, upon actuation of air cylinders 213, lower wedge 239 is movable upwardly and inwardly (Fig. 37) into engagement between annular yoke 49 and pile 11, or downwardly and outwardly out of engagement. From the foregoing description, it will be apparent that if it is desired to place upper wedges 232 into frictional engagement between annular yoke 49 and pile 11, air cylinders 213 are pressurized above their respective pistons through lines 214, thereby lowering pipe guides 218, wedge ring 222, and upper wedges 232. Conversely, when it is desired to place lower wedges 239 into frictional engagement between annular yoke 49 and pile 11, air cylinders 213 are pressurized below their respective pistons, thereby raising pipe guides 218 and lower wedges 239.

Other details of this modification include stop rings 250 secured to pipe guides 218 and adapted to bear against collars 219, thus defining upper and lower limits of movement of said pipe guides 218 and preventing overtravel of the latter which might damage the system. The "neutral" position of pipe guides 218, wherein neither upper wedges 232 nor lower wedges 239 are in frictional engagement between annular yoke 49 and pile 11, is definable and maintainable by pins 251 insertable through pipe guides 218 to bear against collars 219 as shown in Fig. 37. Adequate centering of annular yoke 49 about pile 11 is provided for by securing inwardly extending guides 252 and 253 to conical sections 76 and 77, respectively, of said annular yoke 49. Following good engineering practice, valves 254 may be placed in lines 214 and 215 to isolate individual air cylinders without interfering with the operation of the other air cylinders. If this modification of wedge positioner is used, fingers 104 are eliminated from the design, as the upper wedges 232 and lower wedges 239 are raised or lowered relative to annular yoke 49 solely by the motive force of air cylinders 213.

My invention may be modified by eliminating wedges 29 about access trunks 12. In this embodiment of my invention, when foundation 6 is to be submerged, annular yokes 49 at access trunks 12 are operated in diagonally opposite pairs in a manner similar to that used in embedding piles 11. Thus, with lower wedge segments 86 or lower wedges 239 in operative position, two diagonally opposite annular yokes 49 at access trunks 12 are brought through a downward pushing stroke, and are held stationary at the end of this stroke while the other two diagonally opposite annular yokes 49 at access trunks 12 are raised and then lowered. It will be apparent that lower wedge segments 86 or lower wedges 239 at those annular yokes 49 which are temporarily held stationary at the bottoms of their strokes perform the same function as wedges 29 in holding down foundation 6 against those forces which would tend to lift it. The operation of annular yokes 49 in two diagonally opposite pairs can be continued seriatim until foundation 6 is grounded. Of course, in this modification, wedge positioner 31 and bars 30 are also eliminated.

In establishing mobile drilling platform 1 on a marine site, it may be desirable, rather than dropping piles 11 to marine floor 3, to lower said piles 11 in step-wise fashion. Thus, considering the wedge positioners of Fig. 33 and of Figs. 37–43, with upper wedge segments 84 or upper wedges 232 in operative position, annular yoke 49 is raised slightly, thus raising pile 11 and disengaging wedges 18 and 19. These wedges 18 and 19 are then removed from yokes 16 and 17 respectively. Annular yoke 49 is lowered, thus lowering pile 11. At or near the bottom of the stroke, wedges 18 and 19 are reinserted in yokes 16 and 17 respectively so as to hole pile 11. Upper wedge segments 84 or upper wedges 232 are removed from operative position, being placed in neutral position, and annular yoke 49 is raised to a point near the top of its stroke. Upper wedge segments 84 or upper wedges 232 are restored to operative position, and annular yoke 49 is raised slightly to raise pile 11 and disengage wedges 18 and 19 which are then removed from yokes 16 and 17 respectively. Annular yoke 49 is then lowered, thus lowering pile 11. This procedure is continued seriatim until pile 11 is grounded, after which pile 11 is embedded in marine floor 3 as described earlier in this specification. Essentially the same procedure in lowering pile 11 is followed in connection with the wedge positioner of Fig. 7. However, care should be taken that in lowering annular yoke 49, it should not be lowered past the point at which fingers 104 would trip double-wedge 50 from the lowermost to the uppermost position before wedges 18 and 19 are in position in yokes 16 and 17 respectively. Otherwise, the pile 11 would drop to the marine floor 3. After said wedges 18 and 19 are in place, annular yoke 49 can be lowered to cause fingers 104 to trip double-wedge 50 into the uppermost position for the upward stroke or, if convenient, double-wedge 50 can be placed in the uppermost position by means of a pry bar.

I have previously described the general operation of the several wedges associated with annular yoke 49 as a cycle comprising two steps, namely a driving stroke (pushing or pulling, depending upon which wedges or wedge segments are in operative position between annular yoke 49 and pile 11 or access trunk 12) and a return or ratcheting stroke. It may be desired to place the wedges or wedge segments in neutral position for the return stroke, thus eliminating the ratcheting effect so as to reduce the wear on the friction surfaces of said wedges or wedge segments. In connection with the wedge positioners of Fig. 33 and of Figs. 37–43, I have described how the wedge segments or wedges are placed in neutral. Similar means (properly positioned holes and pins) may be used in connection with the wedge positioner of Fig. 7 to place double-wedge 50 in neutral.

In connection with extracting piles 11 from marine floor 3, it may be desired to keep upper and lower clamping means 124 and 127 retracted. This would permit mobile drilling platform 1 to heel or trim to some extent in the event a pile 11 on one side thereof becomes loose before a pile 11 on the other side thereof, to avoid transmitting bending moments to the piles 11.

Although I have shown and described my invention in considerable detail, I do not wish to be limited to the exact construction shown and described, but may use such substitutions, modifications or equivalents thereof as are embraced within the scope of my invention or as pointed out in the claims.

I claim:

1. A marine structure comprising a buoyant member, a framework mounted on said buoyant member, a platform removably mounted on said framework, pile guides mounted on said buoyant member, pile guides mounted on said platform in vertical alignment with the pile guides on said buoyant member, piles extending through said pile guides in engageable relation with a marine floor, means for securing said platform to said piles, means for varying the buoyancy of said buoyant member, a vertical member secured to said buoyant member and communicating with the interior thereof, a guide mounted on said platform through which said vertical member passes, means operatively connecting said platform and said vertical member for raising and lowering said buoyant member relative to said platform and means for securing said platform to said vertical member to maintain said platform and said buoyant member at a predetermined distance from each other.

2. A marine structure comprising a buoyant member, a framework mounted on said buoyant member, a platform removably mounted on said framework, piling guides mounted on said buoyant member, piling guides mounted on said platform in vertical alignment with the piling guides on said buoyant member, piles extending through said piling guides and engaging a marine floor, means for securing said platform to said piles, means for varying the buoyancy of said buoyant member, a hollow vertical tubular member secured to said buoyant member, a guide in said platform through which said tubular member passes, a yoke surrounding said tubular member, means securing said yoke to said tubular member, cylinder and piston means connecting said yoke to said platform, and means for actuating said cylinder and piston means to move said buoyant member relatively to said platform.

3. A marine structure including a buoyant member, hollow guides secured to said buoyant member and extending vertically thereabove, a platform mounted on said guides and spaced from said buoyant member, guides on said platform in registry with the guides on said buoyant member, piles extending through said guides and engaging a marine floor, an additional hollow guide on said platform, a vertical tubular member secured to said buoyant member and extending vertically through said additional guide, yokes surrounding said piles and secured thereto, adjustable means connecting said platform to said yokes for effecting relative vertical movement between the platform and the piles, a yoke surrounding said vertical tubular member and secured thereto, and adjustable means connecting said platform to said yoke for effecting relative vertical movement between the platform and the buoyant member.

4. A marine structure including a buoyant member, hollow guides secured to said buoyant member and extending vertically thereabove, a platform mounted on said guides and spaced from said buoyant member, guides on said platform in registry with the guides on said buoyant member, piles extending through said guides and engaging a marine floor, an additional hollow guide on said platform, a vertical tubular member secured to said buoyant member and extending vertically through said additional guide, yokes surrounding said piles, and secured thereto, adjustable means connecting said platform to said yokes for effecting relative vertical movement between the platform and the piles, a yoke surrounding said vertical tubular member and secured thereto, adjustable means connecting said platform to said yoke for effecting relative vertical movement between the platform and the buoyant member, and means for varying the buoyancy of said buoyant member.

5. A marine structure comprising a buoyant member, a framework mounted on said buoyant member, a platform removably mounted on said framework, pile guides mounted on said buoyant member, pile guides mounted on said platform in vertical alignment with the pile guides on said buoyant member, piles extending through said pile guides and engaging a marine floor, means for securing the platform to the piles, an additional guide through said platform, a vertical tubular member secured to said buoyant member and extending through said additional guide, means for varying the buoyancy of said buoyant member, adjustable means on said platform and connected to said vertical tubular member for effecting relative vertical movement between said platform and said buoyant member, and means associated with the pile guides on said buoyant member adjustable to and from said piles to restrict relative movement between said pile and said pile guides.

6. The method of operating a drilling barge characterized by a platform in variable vertical relationship with a submersible foundation, said method comprising: floating the drilling barge in a vertically closed position to the drilling site, embedding piles into the marine floor, securing the platform to the piles, adding ballast to the foundation to reduce its buoyancy until said foundation has a slight net positive buoyancy, and then exerting a force between said platform and said submersible foundation to push down on said foundation to submerge it to the marine floor.

7. The method of relocating a drilling barge comprising a platform in variable vertical relationship with a submersible foundation, said method comprising: adjusting the amount of ballast in the submerged foundation until the buoyancy thereof is slightly negative, pulling up said foundation against the force of embedment of piles in the marine floor until the foundation breaks water, deballasting the foundation, pulling the foundation up into vertically closed relation with the platform, freeing the platform from the piles, extracting the piles from the marine floor against the buoyancy of the foundation, and floating the drilling barge to the next location.

8. The method of operating a marine structure comprising a buoyant submersible foundation, a platform, two members secured to said foundation and extending upwardly therefrom, and two pushing means each operatively interposed between said platform and one of said members and each having upper and lower limits of travel, each of said pushing means when engaged with its respective member permitting only downward movement of said member relative to said pushing means, said method comprising: engaging one of said pushing means with its respective member, pushing down said member and said foundation until said pushing means is adjacent its lower limit of travel, repeating these first two steps with the second pushing means, disengaging the first mentioned pushing means from its member and raising said first mentioned pushing means to a position adjacent its upper limit of travel, repeating the first two steps with the first mentioned pushing means, disengaging the second pushing means from its member and raising said second pushing means to a position adjacent its upper limit of travel, repeating the first two steps with the second pushing means, disengaging the first mentioned pushing means from its member and raising said first mentioned pushing means to a position adjacent its upper limit of travel, and continuing the foregoing sequence seriatim until the foundation is submerged to the desired level.

9. The method of operating a marine structure comprising a buoyant submersible foundation, a platform, two members secured to said foundation and extending upwardly therefrom, and two pushing means each operatively interposed between said platform and one of said members and each having upper and lower limits of travel, each of said pushing means when engaged with its respective member permitting only downward movement of said member relative to said pushing means, said method comprising: destroying less than all of the positive buoyancy of the foundation, engaging one of said pushing means with its respective member, pushing down said member and said foundation until said pushing means is adjacent its lower limit of travel, repeating these first two steps with the second pushing means, disengaging the first mentioned pushing means from its member and raising said first mentioned pushing means to a position adjacent its upper limit of travel, repeating the first two steps with the first mentioned pushing means, disengaging the second pushing means from its member and raising said second pushing means to a position adjacent its upper limit of travel, repeating the first two steps with the second pushing means, disengaging the first mentioned pushing means from its member and raising said first mentioned pushing means to a position adjacent its upper limit of travel, and continuing the foregoing sequence seriatim until the foundation is submerged to the desired level.

10. The method of operating a marine structure comprising a buoyant submersible foundation, a platform, piles engaging the marine floor, two members secured to said foundation and extending upwardly therefrom, and two pushing means each operatively interposed between said platform and one of said members and each having upper and lower limits of travel, each of said pushing means when engaged with its respective member permitting only downward movement of said member relative to said pushing means, said method comprising: securing said platform to said piles, engaging one of said pushing means with its respective member, pushing down said member and said foundation until said pushing means is adjacent its lower limit of travel, repeating these first two steps with the second pushing means, disengaging the first mentioned pushing means from its member and raising said first mentioned pushing means to a position adjacent its upper limit of travel, repeating the first two steps with the first mentioned pushing means, disengaging the second pushing means from its member and raising said second pushing means to a position adjacent its upper limit of travel, repeating the first two steps with the second pushing means, disengaging the first mentioned pushing means from its member and raising said first mentioned pushing means to a position adjacent its upper limit of travel, and continuing the foregoing sequence seriatim until the foundation is submerged to the desired level.

11. The method of operating a marine structure comprising a buoyant submersible foundation, a platform, piles engaging the marine floor, two members secured to said foundation and extending upwardly therefrom, and two pushing means each operatively interposed between said platform and one of said members, and each having upper and lower limits of travel, each of said pushing means when engaged with its respective member permitting only downward movement of said member relative to said pushing means, said method comprising: securing said platform to said piles, destroying less than all of the positive buoyancy of the foundation, engaging one of said pushing means with its respective member, pushing down said member and said foundation until said pushing means is adjacent its lower limit of travel, repeating these first two steps with the second pushing means, disengaging the first mentioned pushing means from its member and raising said first mentioned pushing means to a position adjacent its upper limit of travel, repeating the first two steps with the first mentioned pushing means, disengaging the second pushing means from its member and raising said second pushing means to a position adjacent its upper limit of travel, repeating the first two steps with the second pushing means, disengaging the first mentioned pushing means from its member and raising said first mentioned pushing means to a position adjacent its upper limit of travel, and continuing the foregoing sequence seriatim until the foundation is submerged to the desired level.

12. The method of operating a marine structure comprising a buoyant submersible foundation, a platform, two members secured to said foundation and extending upwardly therefrom, and two pushing means each operatively interposed between said platform and one of said members and each having upper and lower limits of travel, said method comprising: engaging one of said pushing means with its respective member, pushing down said member and said foundation until said pushing means is adjacent its lower limit of travel, engaging the second pushing means with its respective member, pushing down said last mentioned member and said foundation while simultaneously temporarily disengaging the first mentioned pushing means from its respective member until said second pushing means is adjacent its lower limit of travel, disengaging the first pushing means from its member, raising said first pushing means to a position adjacent its upper limit of travel, engaging said first pushing means with its member, pushing down said last mentioned member and said foundation while simultaneously temporarily disengaging the second pushing means from its member until said first pushing means is adjacent its lower limit of travel, and continuing seriatim until the foundation is submerged to the desired depth.

13. The method of operating a marine structure comprising a buoyant submersible foundation, a platform, two members secured to said foundation and extending upwardly therefrom, and two pushing means each operatively interposed between said platform and one of said members and each having upper and lower limits of travel, said method comprising: destroying less than all of the positive buoyancy of the foundation, engaging one of said pushing means with its respective member, pushing down said member and said foundation until said pushing means is adjacent its lower limit of travel, engaging the second pushing means with its respective member, pushing down said last mentioned member and said foundation while simultaneously temporarily disengaging the first mentioned pushing means from its respective member until said second pushing means is adjacent its lower limit of travel, disengaging the first pushing means from its member, raising said first pushing means to a position adjacent its upper limit of travel, engaging said first pushing means with its member, pushing down said last mentioned member and said foundation while simultaneously temporarily disengaging the second pushing means from its member until said first-pushing means is adjacent its lower limit of travel, and continuing seriatim until the foundation is submerged to the desired depth.

14. The method of operating a marine structure comprising a buoyant submersible foundation, a platform, piles engaging the marine floor, two members secured to said foundation and extending upwardly therefrom, and two pushing means each operatively interposed between said platform and one of said members and each having upper and lower limits of travel, said method comprising: securing said platform to said piles, engaging one of said pushing means with its respective member, pushing down said member and said foundation until said pushing means is adjacent its lower limit of travel, engaging the second pushing means with its respective member, pushing down said last mentioned member and said foundation while simultaneously temporarily disengaging the first mentioned pushing means from its respective member until said second pushing means is adjacent its lower limit of travel, disengaging the first pushing means from its member, raising said first pushing means to a position adjacent its upper limit of travel, engaging said first pushing means with its member, pushing down said last mentioned member and said foundation while simultaneously temporarily disengaging the second pushing means from its member until said first pushing means is adjacent its lower limit of travel, and continuing seriatim until the foundation is submerged to the desired depth.

15. The method of operating a marine structure comprising a buoyant submersible foundation, a platform, piles engaging the marine floor, two members secured to said foundation and extending upwardly therefrom, and two pushing means each operatively interposed between said platform and one of said members and each having upper and lower limits of travel, said method comprising: securing said platform to said piles, destroying less than all of the positive buoyancy of the foundation, engaging one of said pushing means with its respective member, pushing down said member and said foundation until said pushing means is adjacent its lower limit of travel, engaging the second pushing means with its respective member, pushing down said last mentioned member and said foundation while simultaneously temporarily disengaging the first mentioned pushing means from its respective member until said second pushing means is adjacent its lower limit of travel, disengaging the first pushing means from its member, raising said first pushing means to a position adjacent its upper limit of travel, engaging said first pushing means with its member, pushing down said last mentioned member and said foundation while simultaneously temporarily disengaging the second pushing means from its member until said first pushing means is adjacent its lower limit of travel, and continuing seriatim until the foundation is submerged to the desired depth.

16. A marine structure comprising a submerged first member in engagement with the marine floor, piles extending through said first member, said piles engaging the marine floor and projecting above a body of water, a second member secured to said first member and projecting above the body of water, an operating platform secured to said piles at an elevation above the body of water, second member gripping means mounted to said operating platform and engageable with said second member, and means to raise or selectively to lower said second member gripping means relative to said operating platform to vary the amount of bearing of said first member on said marine floor, whereby said operating platform is supported in part by the skin friction of said piles in the marine floor and in part by the direct bearing of said first member on the marine floor.

17. A marine structure as in claim 16, further including means to vary the buoyancy of said first member, whereby said operating platform is supported in part by the skin friction of said piles in the marine floor, in part by the direct bearing of said first member on the marine floor, and in part by the buoyancy of said first member.

18. A drilling barge for operating in a body of water overlying a marine floor, said drilling barge comprising a submersible foundation, a plurality of hollow guide columns secured to and extending above said foundation, said guide columns defining unobstructed vertical openings through said foundation, an operating platform removably positioned on said guide columns, a plurality of piles in embeddable relationship to the marine floor, each pile being slidably mounted in one of said guide columns and extending through said operating platform, a plurality of gripping means adjustably mounted to said operating platform to selectively frictionally hold, push or pull said piles relative to said operating platform, each of said gripping means being associated with one of said piles, and submerging means to submerge said foundation to the marine floor, said submerging means comprising an access trunk secured to said foundation in communicating relationship with the interior thereof and of length sufficient to extend upwardly to the level of the operating platform when said foundation is in contact with the marine floor, access trunk gripping means associated with the operating platform and frictionally engageable with said access trunk, and means operatively interposed between said access trunk gripping means and said operating platform to selectively raise, hold or lower said access trunk gripping means and thereby selectively to raise, hold or lower said access trunk and said foundation relative to said operating platform.

19. A drilling barge for operating in a body of water overlying a marine floor, said drilling barge comprising a submersible foundation, a plurality of hollow guide columns secured to and extending above said foundation, said guide columns defining unobstructed vertical openings through said foundation, an operating platform removably positioned on said guide columns, a plurality of piles in embeddable relationship to the marine floor, each pile being slidably mounted in one of said guide columns and extending through said operating platform, a plurality of gripping means adjustably mounted to said operating platform to selectively frictionally hold, push or pull said piles relative to said operating platform, each of said gripping means being associated with one of said piles, and submerging means to submerge said foundation to the marine floor, said drilling barge further including ballast compartments and a pump room in said foundation, said submerging means comprising an access trunk secured to said foundation in communicating relationship with said pump room and of length sufficient to extend upwardly at least to the level of the operating platform when said foundation is in contact with the marine floor, means to introduce water into said ballast compartments, means to vent said ballast compartments, access trunk gripping means associated with the operating platform and frictionally engageable with said access trunk, and means operatively interposed between said access trunk gripping means and said operating platform to selectively raise, hold or lower said access trunk gripping means and thereby selectively to raise, hold or lower said access trunk and said foundation relative to said operating platform.

References Cited in the file of this patent

UNITED STATES PATENTS 1,922,747 Roemer ---------------- Aug. 15, 1933

(Other references on following page)

UNITED STATES PATENTS

| | | |
|---|---|---|
| 2,589,146 | Samuelson | Mar. 11, 1952 |
| 2,591,225 | Wilson | Apr. 1, 1952 |
| 2,597,691 | Wikstrom | May 20, 1952 |
| 2,603,068 | Wilson | July 15, 1952 |
| 2,652,693 | Goldman | Sept. 22, 1953 |
| 2,657,540 | Templeton | Nov. 3, 1953 |
| 2,675,681 | Dawson | Apr. 10, 1954 |
| 2,771,747 | Rechtin | Nov. 27, 1956 |
| 2,775,869 | Pointer | Jan. 1, 1957 |

FOREIGN PATENTS

| | | |
|---|---|---|
| 1,105,948 | France | July 13, 1955 |